United States Patent
Trani

(10) Patent No.: US 10,235,854 B2
(45) Date of Patent: Mar. 19, 2019

(54) TAILGATING DETECTION IN FRICTIONLESS ACCESS CONTROL SYSTEM

(71) Applicant: Sensormatic Electronics, LLC, Boca Raton, FL (US)

(72) Inventor: James Trani, Billerica, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 100 days.

(21) Appl. No.: 15/160,736

(22) Filed: May 20, 2016

(65) Prior Publication Data

US 2016/0284183 A1 Sep. 29, 2016

Related U.S. Application Data

(63) Continuation-in-part of application No. 14/605,165, filed on Jan. 26, 2015, now Pat. No. 9,697,656.
(Continued)

(51) Int. Cl.
*G05B 19/16* (2006.01)
*G08B 13/196* (2006.01)
(Continued)

(52) U.S. Cl.
CPC .... *G08B 13/19695* (2013.01); *G07C 9/00111* (2013.01); *G07C 9/00174* (2013.01);
(Continued)

(58) Field of Classification Search
CPC ..... H04W 4/008; H04W 4/023; H04W 4/029; H04W 4/021; H04W 4/043; H04W 12/08;
(Continued)

(56) References Cited

U.S. PATENT DOCUMENTS

| 7,035,650 B1 | 4/2006 | Moskowitz et al. |
| 8,009,013 B1 | 8/2011 | Hirschfeld et al. |

(Continued)

FOREIGN PATENT DOCUMENTS

| EP | 1981183 A2 | 10/2008 |
| GB | 2468731 A | 9/2010 |

(Continued)

OTHER PUBLICATIONS

International Search Report and Written Opinion of the International Searching Authority, dated Sep. 5, 2016, from International Application PCT/US2016/033600, filed May 20, 2016. Twelve pages.

(Continued)

*Primary Examiner* — Tesfaldet Bocure
(74) *Attorney, Agent, or Firm* — HoustonHogle LLP

(57) ABSTRACT

A system and method for determining tailgating of users in a frictionless access control system are disclosed. The access control system includes a positioning unit that tracks locations of users carrying user devices relative to an access point of a premises, where the user devices transmit user information identifying the users via wireless signals. The access control system then determines whether the users are authorized to pass through the access point based on the wireless signals from the user devices and determines whether non-authorized users are tailgating through the access point with authorized users. In embodiments, the system can also determine tailgating of the users in response to analyzing video data of a scene including the users, where the video data is generated by a video camera positioned to capture the users when the users are within the threshold area.

23 Claims, 13 Drawing Sheets

Related U.S. Application Data

(60) Provisional application No. 62/039,039, filed on Aug. 19, 2014, provisional application No. 62/045,939, filed on Sep. 4, 2014, provisional application No. 62/164,054, filed on May 20, 2015, provisional application No. 62/181,434, filed on Jun. 18, 2015, provisional application No. 62/185,349, filed on Jun. 26, 2015, provisional application No. 62/193,907, filed on Jul. 17, 2015.

(51) Int. Cl.
| | | |
|---|---|---|
| *H04B 7/04* | (2017.01) | |
| *H04W 4/02* | (2018.01) | |
| *G07C 9/00* | (2006.01) | |
| *H04W 4/021* | (2018.01) | |
| *H04W 4/04* | (2009.01) | |
| *H04W 12/08* | (2009.01) | |
| *H04W 4/029* | (2018.01) | |

(52) U.S. Cl.
CPC .............. *H04B 7/04* (2013.01); *H04W 4/021* (2013.01); *H04W 4/023* (2013.01); *H04W 4/029* (2018.02); *H04W 4/043* (2013.01); *H04W 12/08* (2013.01); *G07C 2009/00769* (2013.01); *G07C 2209/63* (2013.01)

(58) Field of Classification Search
CPC ...... G07C 2009/00769; G07C 9/00174; G07C 2009/00317; G07C 2009/00333; G07C 9/00111; G08B 13/19695; H04B 7/04
See application file for complete search history.

(56) References Cited

U.S. PATENT DOCUMENTS

| | | | |
|---|---|---|---|
| 8,430,310 | B1 | 4/2013 | Ho et al. |
| 9,697,656 | B2 | 7/2017 | Trani |
| 2004/0153671 | A1* | 8/2004 | Schuyler .................. G07C 9/00 726/9 |
| 2005/0062649 | A1 | 3/2005 | Chiang et al. |
| 2006/0270458 | A1 | 11/2006 | Watanabe |
| 2006/0279422 | A1 | 12/2006 | Sweatte |
| 2007/0109111 | A1 | 5/2007 | Breed et al. |
| 2008/0164995 | A1 | 7/2008 | Coronel et al. |
| 2008/0285802 | A1* | 11/2008 | Bramblet ................. G07C 9/00 382/103 |
| 2009/0219152 | A1 | 9/2009 | Angelo et al. |
| 2010/0094482 | A1 | 4/2010 | Schofield et al. |
| 2010/0194566 | A1* | 8/2010 | Monden .................. G07C 9/00 340/568.1 |
| 2010/0233975 | A1 | 9/2010 | Wu et al. |
| 2011/0314539 | A1 | 12/2011 | Horton |
| 2011/0316703 | A1* | 12/2011 | Butler .................. G08B 21/245 340/573.1 |
| 2012/0040650 | A1 | 2/2012 | Rosen |
| 2012/0062422 | A1 | 3/2012 | Wu et al. |
| 2012/0062427 | A1 | 3/2012 | Wu |
| 2012/0154115 | A1 | 6/2012 | Herrala |
| 2012/0181333 | A1 | 7/2012 | Krawczewicz et al. |
| 2012/0202560 | A1 | 8/2012 | Donaldson |
| 2012/0242481 | A1* | 9/2012 | Gernandt .......... G06K 19/0705 340/539.13 |
| 2012/0280783 | A1 | 11/2012 | Gerhardt et al. |
| 2012/0330849 | A1 | 12/2012 | Nielsen et al. |
| 2013/0002399 | A1 | 1/2013 | Frueh |
| 2013/0138314 | A1 | 5/2013 | Viittala et al. |
| 2013/0149991 | A1 | 6/2013 | Hepo-Oja |
| 2013/0176107 | A1 | 7/2013 | Dumas et al. |
| 2013/0214898 | A1* | 8/2013 | Pineau .................... G06F 21/32 340/5.6 |
| 2013/0237193 | A1 | 9/2013 | Dumas et al. |
| 2013/0237272 | A1 | 9/2013 | Prasad |
| 2014/0015978 | A1 | 1/2014 | Smith |
| 2014/0077929 | A1 | 3/2014 | Dumas et al. |
| 2014/0129006 | A1 | 5/2014 | Chen et al. |
| 2014/0167912 | A1 | 6/2014 | Snyder et al. |
| 2014/0183269 | A1 | 7/2014 | Glaser |
| 2014/0197989 | A1 | 7/2014 | Hepo-Oja |
| 2014/0201537 | A1 | 7/2014 | Sampas |
| 2014/0240088 | A1* | 8/2014 | Robinette .......... G08B 13/1427 340/5.61 |
| 2014/0253326 | A1 | 9/2014 | Cho et al. |
| 2014/0266585 | A1 | 9/2014 | Chao et al. |
| 2015/0071274 | A1 | 3/2015 | Sugar et al. |
| 2015/0348220 | A1 | 12/2015 | Sharma et al. |
| 2016/0055692 | A1 | 2/2016 | Trani |
| 2016/0267760 | A1 | 9/2016 | Trani |
| 2016/0284147 | A1 | 9/2016 | Trani |
| 2016/0343187 | A1 | 11/2016 | Trani |
| 2016/0344091 | A1 | 11/2016 | Trani |
| 2017/0256107 | A1 | 9/2017 | Trani |

FOREIGN PATENT DOCUMENTS

| | | |
|---|---|---|
| WO | 9606409 A1 | 2/1996 |
| WO | 2016028481 A1 | 2/2016 |

OTHER PUBLICATIONS

"Apriva Reader." Apriva. Retrieved from http://www.apriva.com/iss/solutions/apriva-reader. 2 pages. Dec. 2014.

"EK6 Bluetooth Proximity Reader: EK6 Installation Guide." EC Key. 2 pages. Mar. 2014.

EK6 Bluetooth Proximity Readers. EC Key, 2014. Retrieved from http://eckey.com/enterprise-access. 2 pages.

International Search Report and Written Opinion of the International Searching Authority, dated Oct. 28, 2015 from International Application PCT/US2015/043455, International Filing Date Aug. 3, 2015. Ten pages.

Martin, Zack. "Vodafone piloting emerging access control tech." SecureIDNews, Sep. 26, 2014. Retrieved from http://www.secureidnews.com/news-item/vodafone-piloting-emerging-access-control-tech. 2 pages.

International Search Report and Written Opinion of the International Searching Authority, dated Aug. 8, 2016 from International Application PCT/US2016/033597, International Filing Date May 20, 2016. Eleven pages.

Jonietz, Ericka, "Injecting Liquid Metal Into a Polymer Results in a Twistable, Stretchable Antenna," (2009).

* cited by examiner

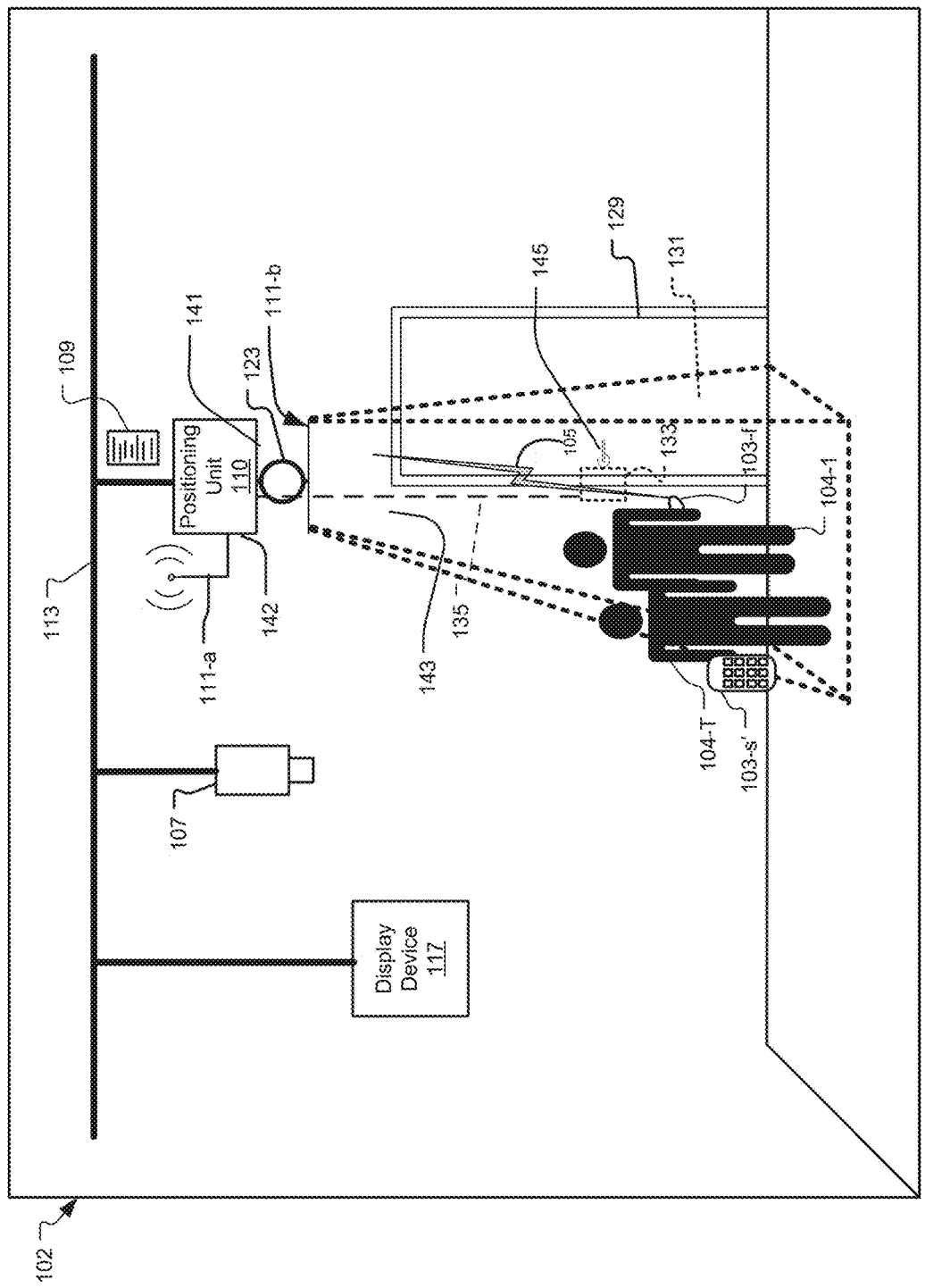

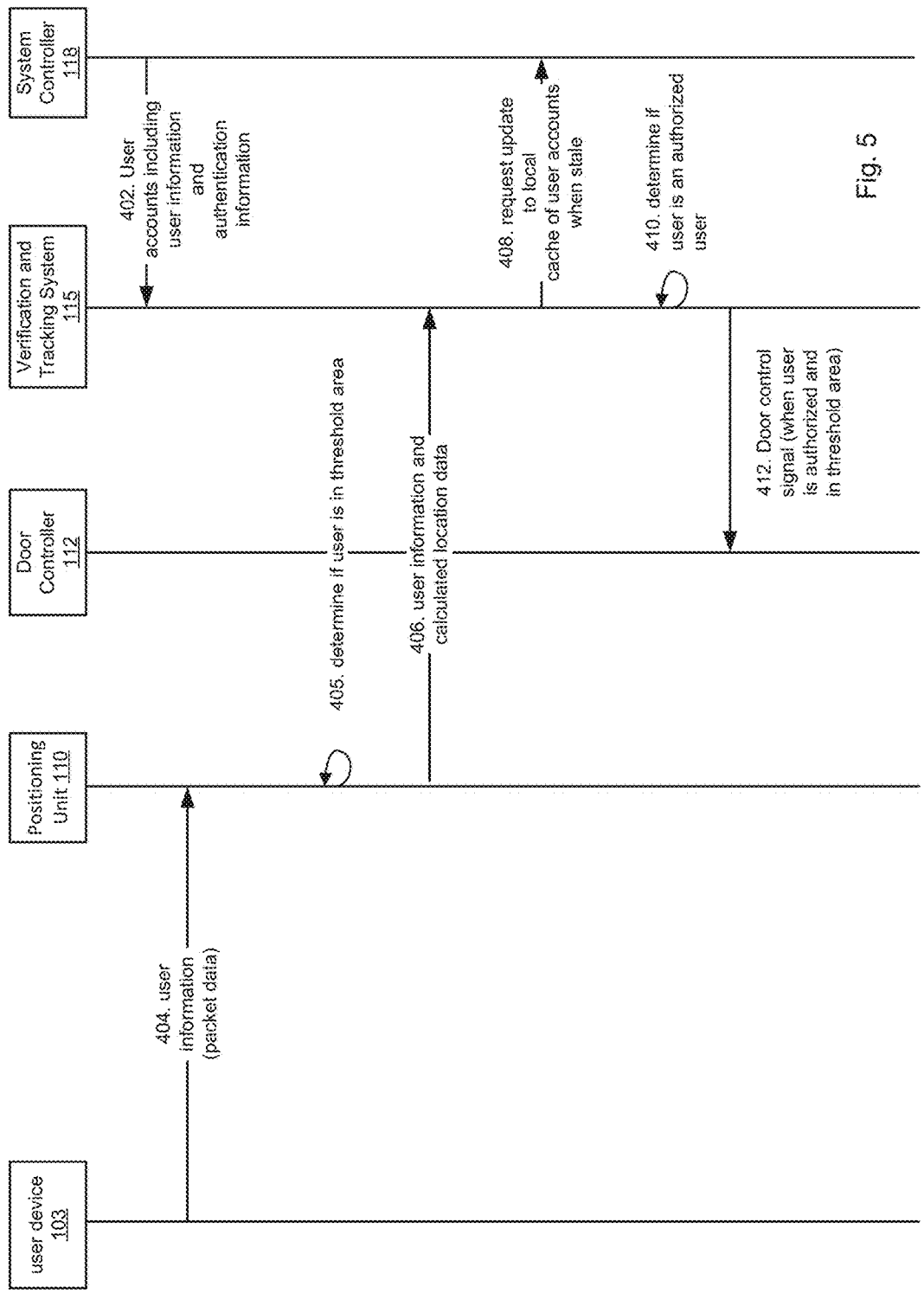

TAILGATING DETECTION IN FRICTIONLESS ACCESS CONTROL SYSTEM

RELATED APPLICATIONS

This application is a continuation-in-part of U.S. application Ser. No. 14/605,165, now U.S. Pat. No. 9,697,656, filed on Jan. 26, 2015, which claims the benefit under 35 USC 119(e) of U.S. Provisional Application Nos. 62/039,039, filed on Aug. 19, 2014 and 62/045,939, filed on Sep. 4, 2014.

This application claims the benefit under 35 USC 119(e) of U.S. Provisional Application No. 62/164,054, filed on May 20, 2015; 62/181,434, filed on Jun. 18, 2015; 62/185,349, filed on Jun. 26, 2015, and 62/193,907, filed on Jul. 17, 2015, all of which are incorporated herein by reference in their entirety.

This application is related to:

U.S. application Ser. No. 15/160,722, now U.S. Patent Publication No. US 2016-0284147 A1, filed on May 20, 2016, entitled "Access Control System with Omni and Directional Antennas" by James Trani;

U.S. application Ser. No. 15/160,753, now U.S. Patent Publication No. US 2016-0267760 A1, filed on May 20, 2016, entitled "Video Recognition in Frictionless Access Control System," by James Trani;

U.S. application Ser. No. 15/160,765, now U.S. Patent Publication No. US 2016-0343187 A1, and International Application No. PCT/US2016/033597, now International Publication No. WO 2016/187573, both filed on May 20, 2016, entitled "Frictionless Access System for Public Access Point," by James Trani; and U.S. application Ser. No. 15/160,775, now U.S. Patent Publication No. US 2016-0344091 A1, and International Application No. PCT/US2016/033600, now International Publication No. WO 2016/187574, both filed on May 20, 2016, entitled "Portable Device having Directional BLE Antenna," by James Trani.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control readers, video surveillance cameras, network video recorders (NVRs), and door controllers, to list a few examples.

The access control readers are often installed at access points of the buildings to control access to restricted areas, such as buildings or areas of the buildings. Examples of access points include front and interior doors of a building, elevators, hallways connecting two areas of a building, to list a few examples. The access control readers authenticate identities of (or authorize) individuals and then permit those authenticated individuals to access the restricted areas through the access points. Typically, individuals interact with the access control readers by swiping keycards or bringing contactless smart cards within range (approximately 2-3 inches or 5 centimeters) of a reader. The access control readers read the information of the keycards and then the access control systems determine if the individuals are authorized to access the restricted areas. If the individuals are authorized to enter the restricted areas, then the access control readers allow access to the restricted areas by unlocking locked doors, signaling that doors should be unlocked, or generating alarms upon unauthorized entry, for example.

SUMMARY OF THE INVENTION

Traditional security systems using access control readers have limitations. The systems require the individuals to present access cards to the card reader at each access point to gain access to the restricted areas. Individuals typically must place their access cards such that the access cards either make direct physical contact with the access readers or are within a few inches of the access readers. This formal interaction process can be an inconvenience to the users of the system.

In contrast, the present system is directed to a frictionless access control and tracking system. A frictionless system uses wireless technology that enables a more transparent method for identifying and tracking individuals while providing similar access control and tracking as traditional systems and methods. The present system can automatically identify and track individuals and enable access to restricted areas when authorized individuals are approaching or in threshold areas of the access points. Threshold areas are typically areas within close proximity to the access points, such as entrances of the restricted areas, such as an area near a locked access point, in one example. Access points include interior or exterior doors of a building, or elevators, in examples. Frictionless systems accomplish these tasks without requiring the individuals to swipe or wave keycards, for example, at card readers, and can more continuously track those users in and around buildings.

In the present system, users carry active wireless devices on their person that transmit credentials which identify the users to a wireless receiving device, or positioning unit. Credentials are also known as user information. The active wireless user devices, or user devices, include electronic devices such as key fobs (or fobs) or mobile computing devices such as smart phones or tablet computing devices. These user devices broadcast the user information in data packets, also known as packet data. The packet data are received by positioning units.

One issue that arises in access control systems is the problem of tailgating. This occurs when an individual that is not authorized to pass through an access point nevertheless passes through the access point in close physical proximity to an individual that is authorized to pass through the access point.

How tailgating is addressed in frictionless systems is typically more problematic since the system by definition reduces the overt actions required by individuals to interact with the system.

The present system provides additional advantages over traditional systems and methods. In one example, the location information can be used in conjunction with possibly video data to verify the number of individuals and the users carrying the user devices and track any other individuals.

In general, according to one aspect, the invention features an access control system for monitoring an access point. The system comprises a positioning unit for tracking locations of users carrying user devices relative to the access point based on wireless signals from the user devices. The access control system determines whether the users are authorized to pass through the access point based on the wireless signals from the user devices and determines whether non-authorized users are tailgating through the access point.

In the current embodiment, the positioning unit detects the wireless signals from the user devices and determines whether the wireless signals are originating from a threshold area of the access point. The positioning unit can include at least one directional antenna for determining whether the wireless signals are originating from the threshold area and possibly an omnidirectional antenna.

In operation, the system will often in response to the access control system determining that all of the users are non-authorized, deny non-authorized users access through the access point.

The access control system can additionally generate an alert in response to determining that the non-authorized users remain within a threshold area of the access point for longer than a predetermined lingering threshold value.

The access control system determines whether non-authorized users are tailgating through the access point in response to the positioning unit detecting that two or more user devices are first located within a threshold area of the access point, the access control system determining that at least one of the users is not an authorized user, and in response to the positioning unit then detecting that at least one non-authorized user has passed through the access point with at least one authorized user.

In some cases, in response to the access control system determining that the non-authorized user has passed through the access point, the access control system signals door controllers of other access points in the vicinity of the access point associated with the restricted area to deny the non-authorized users to pass through the other access points.

At least one video camera can be used that captures video data of a scene that includes a threshold area of the access point. A video analysis system will then analyze the video data to determine a number of users within a threshold area of the access point. The access control system determines that the users are tailgating by determining that a number of user devices detected within the threshold area by the positioning unit does not match the number of individuals within the threshold area determined by the video analysis system.

In general, according to another aspect, the invention features a method for controlling access of users to an access point. The method comprises tracking locations of users carrying user devices relative to the access point via a positioning unit associated with the access point, based on wireless signals sent from the user devices and determining whether the users are authorized to pass through the access point based on the wireless signals from the user devices and determining whether non-authorized users are tailgating through the access point.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3C is a schematic diagram illustrating an embodiment of the positioning unit with a directional antenna such as a flat patch-array panel or horn antenna, and also illustrating a non-authorized user attempting to "tailgate" or pass through the access point with an authorized user;

FIG. 5 is a sequence diagram for an exemplary implementation of the access control system for providing users with access to a restricted area, where the sequence diagram illustrates the interactions between a mobile active wireless user device (e.g., mobile computing device, e.g., a smartphone, or fob), the positioning unit, a door controller, a verification and tracking system, and a system controller;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
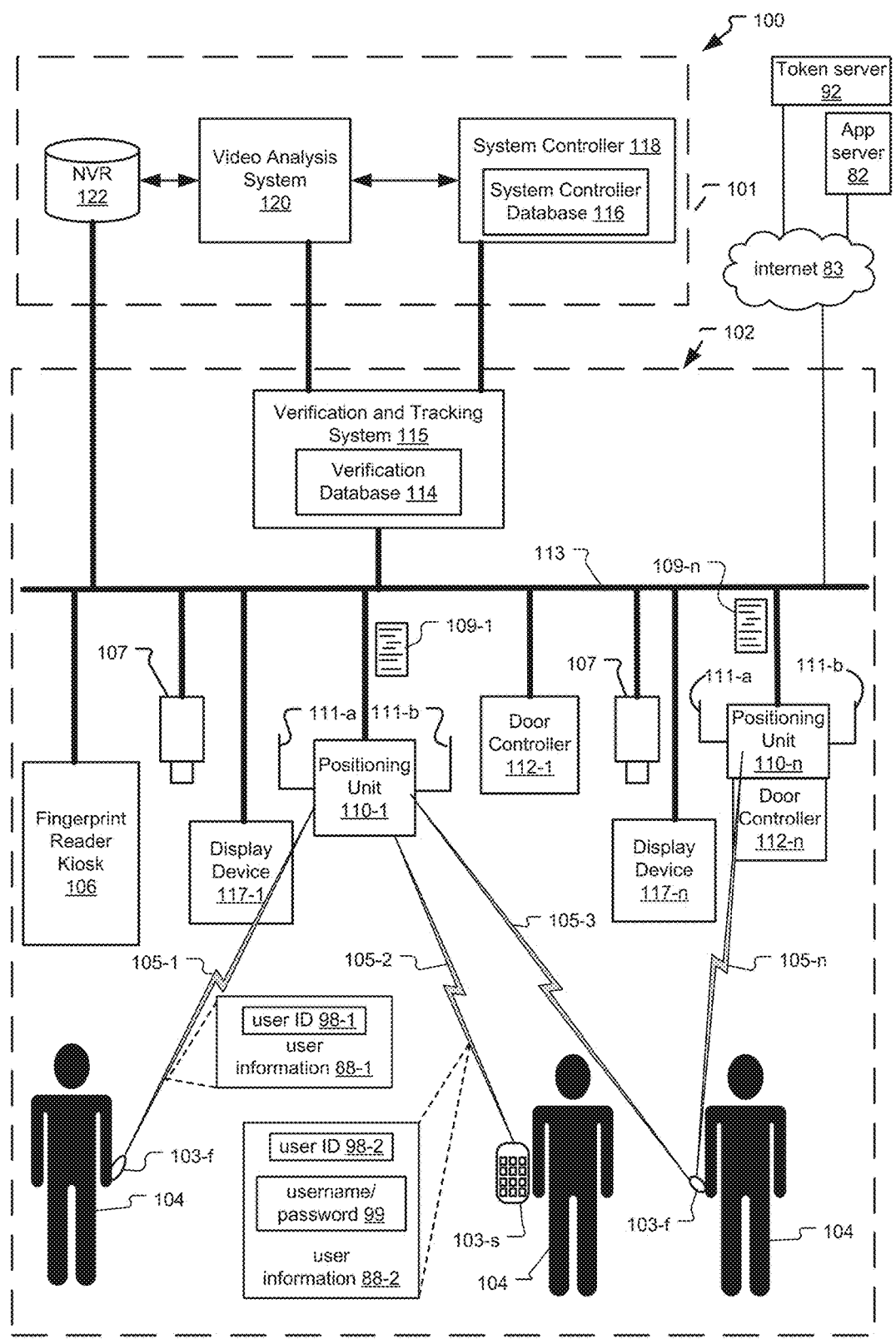
FIG. 1 is a schematic diagram of an access control system that identifies users, tracks locations of active wireless devices, and controls access to different and/or restricted areas.

FIG. 1 is a schematic diagram of an exemplary access control system 100 that identifies users 104, tracks locations of user devices 103 such as fobs 103-f and smart phones 103-s or other mobile computing devices, and enables access to restricted areas of a premises such as a building 102. In the example, the access control system 100 is distributed between two or more locations or buildings 102. The system also includes backend components such as a system controller 118, a video analysis system 120, and a network video recorder 122 that are typically located in a security control room 101 or other secure location of the building 102. Alternatively, one or more of these components could be part of a remote service network such as a cloud-based network, or "cloud."

The system 100 also includes a verification and tracking system 115, and positioning units 110, and may further include additional components such as video cameras 107, a fingerprint reader kiosk 106, display devices 117, and door controllers 112. These devices are usually located within and/or adjacent to the building 102 that is being protected and/or secured by the system 100. These components communicate with one another over a data network 113. The positioning units 110 are located near access points of the building 102 or areas within the buildings such as door access points 129 that enable users 104 to physically enter or exit the building 102 or access different parts. On the other hand, the verification and tracking system 115 will typically control multiple positioning units 110. However, in some still other implementations, the verification and tracking system 115 could be integrated in the same box as the positioning unit 110.

In a typical implementation, users 104 carry user devices 103 (e.g., fobs, smartphones, tablets, phablets, or other mobile computing devices), which broadcast packet data 105-1 to 105-n. The packet data 105 includes user information 88 for identifying the users. The user information 88 can include a unique user ID 98 for each of the user devices 103 and other information for identifying the user such as a username/password 99, name of user, department, work extension, personal phone numbers, email addresses, and employee ID number, in examples. In one example, the user ID 98 includes a token or a hash of the token generated for the user 104, and it may or may not expire after a predetermined time.

In yet another example, a rolling security identification (id) or access code generated within the fob/user device 103 functions as the user ID 98. A rolling access code is a unique authentication code for each user 104. Each mobile phone user device 103 preferably transmits the access code at fixed periodic intervals.

The access code includes a random key or "seed" that is different for each fob/user device 103. The uniqueness of each key is accomplished by including the unique phone number of each mobile phone during calculation of the key, for example. In one implementation, the user ID 98 for user devices 103 is a token generated for each user. Typically, the token will include a TOTP (Time-based One Time Password) combined with the rolling security identification (id) code, or rolling code, maintained within the user device 103. A rolling code typically generates an authentication code associated with each user 104 at fixed intervals. The mobile phone 103 creates a security token from the key, and generates a 16 byte hash of the security token. The mobile phone 103 then includes the hash of the security token as payload within packet data 105 and broadcasts the packet data in wireless signals via Bluetooth.

Users carrying the user devices 103 enroll and/or register the user devices 103 with the system controller 118. When the user device is a fob 103-f, users access the system controller 118 to enroll the fob via a client application of the system controller 118. When the user device is a smart phone or other mobile computing device, 103-s, the users 104 download a security app from the app server 82 to their user device 103-s, where the security app provides access to the system controller 118.

During the enrollment/registration process, the users 104 enter the user information 88 to create a user account 19 for each user on the system controller 118. For a fob user device 103-f, users provide the unique ID of the fob such as its Media Access Control (MAC) address as the user ID 98-1 of the user information 88-1. For a mobile phone (e.g. "smart phone") user device 103-s, users typically include the phone number of the user device 103-s as the user ID 98-2 of the user information 88-2. Users can additionally include other user information 88 for identifying the users such as a username/password combination 99. In response, a user account 19 is created on the system controller 118 for the user with the specified user information 88. More detail concerning user accounts 19 follows the description of FIG. 2, included herein below.

An administrator will typically add authorization information 46 associated with each of the users 104 to the user account 19 based on security objectives. Authorization information 46 determines which users 104 are authorized to access specified restricted buildings or areas of a building 102. In one implementation, the authorization information 46 is provided as a separate access control list for each door controller 112, where the authorization information includes the user information 88 of users that are authorized to access each door controller 112. In another implementation, the authorization information 46 is a single access control list that identifies all door controllers 112-1 through 112-n and the users that are authorized to access the door controllers 112-1 through 112-n.

When enrolling a smart phone user device 103-s with a token as the user ID 98, the smart phone user devices 103 and the system controller 118 first access a token server 92 to request the token. In one implementation, the user, via the security app, includes the phone number of the user device in a request message to the token server 92. In response, the token server 92 generates a token, and sends the token to both the system controller 118 and the user device 103 in response. The token server 92 preferably sends the token to the user device in an SMS message. The token is then included as the user ID 98 within the user information 88 for the user, for both the user information 88 maintained for the user in the system controller 118 and the user information 88 included within the user device 103.

The wireless packet data broadcast from the user devices 103 is preferably secured to prevent unauthorized third parties from intercepting and viewing the packet data 105 during transmission (i.e. during broadcasts). In one example, the packet data 105 is encrypted. In a preferred embodiment, the user devices 103 broadcast the packet data 105 using BLE (Bluetooth low energy) technology.

Bluetooth is a wireless technology that operates in a 2.4 GHz (gigahertz) short-range radio frequency band. In free space, Bluetooth applications typically locate a Bluetooth device by calculating the distance of the user devices 103 from the signal receivers. The distance of the device from the receiver is closely related to the strength of the signal received from the device. A lower power version of standard Bluetooth called Bluetooth Low Energy (BLE), in contrast, consumes between $\frac{1}{2}$ and $\frac{1}{100}$ the power of classic Bluetooth. BLE is optimized for devices requiring maximum battery life, as compared to the emphasis upon higher data transfer rates associated with classic Bluetooth. BLE has a typical broadcast range of about 100-150 feet (approximately 35-46 meters).

When transmitting via BLE, the user devices 103 might send an AltBeacon compliant BLE broadcast message every second. If the user devices 103 utilize tokens as the user ID 98, the user devices 103 preferably include a hash representation of the token/user ID 98 in the BLE broadcast messages. In one implementation, the hash representation of the token is a 16-byte, one-way hash of the token, computed using the phone number of the user device 103-s as the seed key.

In an alternative implementation, the user devices 103 are capable of broadcasting via standard Bluetooth. In still other alternative implementations, the user devices 103 may broadcast via other wireless technologies such as Wi-Fi (IEEE 802.11), active RFID (radio frequency identification), or ZigBee, to list a few examples.

The positioning units 110 each preferably include two or more antennas 111. The packet data 105 are received by antennas 111-a, 111-b of one or more positioning units 110-1 to 110-n, which are located throughout the building 102. The positioning units 110-1 to 110-n determine locations of the users 104 using one or more positioning techniques.

A preferred positioning technique compares the relative signal strengths of the received wireless signals between two antennas 111 of the positioning unit 110. Another positioning technique includes determining time of flight or time of receipt of packet data 105 received at each of the antennas 111 of a positioning unit 110. In yet another positioning technique example, the positioning units 110 employ triangulation between two or more positioning units 110 installed within the building. The positioning units 110 then convert the locations of the users 104 into location data 109 for each of the users. This will typically require the positioning units to share a common reference clock.

The positioning units 110-1 to 110-n receive the packet data 105 including the user information 88 for each user, and then send the user information 88 and the location data 109 to the verification and tracking system 115 via a data network 113. When the user devices 103 utilize tokens as the user ID 98, the positioning units 110 might extract the tokens from the hash representations of the tokens included in the packet data 105. The positioning units 110 use the phone number of the user devices 103 or other reference as the seed key for this purpose. The location data 109 are used by the verification and tracking system 115 to determine motion vectors for and to predict motion intent of the users 104, in examples.

Typically, the data network 113 is a Local Area Network (LAN) such as wired or wireless Ethernet. The positioning units 110-1 to 110-n can also communicate with the verification and tracking system 115 via serial connections, in another example.

As the users 104 and their user devices 103 move through the building 102, the tracking of the user devices 103 and therefore of the users 104 is often "handed off" to other positioning units 110 in order to reduce or eliminate tracking blind spots within the building 102.

The verification and tracking system 115 accesses authorization information 46 in a verification database 114, which it maintains or which it simply accesses, to determine which users 104 are authorized to access specified restricted areas of a building 102 and/or pass through an access point. Once the users 104 are authenticated by the verification and tracking system 115, the verification and tracking system 115 sends a door control signal via the network 113 to the door controller 112-1, in one example. The door controller 112-1 then enables access to a restricted area by unlocking an access point of the restricted area, such as a door 129 or other portal, thereby providing access for the authorized user 104 to the restricted area while also possibly generating an alarm for an unauthorized user. The door controller 112-1 preferably unlocks the door 129 when the authorized user 104 is within a threshold area 131 near the access point (e.g., the door or other portal) of the restricted area.

The door controllers 112-n can also be directly coupled to the positioning units 110-n. In this implementation, the verification and tracking system 115 sends door control signals via the network 113 to the positioning units 110-n, which in turn activate their door controllers 112-n to enable access to the restricted areas.

In a typical implementation, the system 100 includes the system controller 118, which includes a system controller database 116. In general, the system controller 118 might store various user information 88 for each of the users 104 to the system controller database 116. The system controller database 116 also stores the authorization information 46 for the users 104 (e.g., which users 104 are permitted to access which restricted areas). Periodically, the system controller 118 sends updated user information 88 and authorization information 46 to the verification and tracking system 115 via the network 113. In response, the verification and tracking system 115 saves the received user information 88 and authorization information 46 to its verification database 114.

The verification and tracking system 115 accesses the user information 88 and authorization information 46 within its verification database 114, which acts as a local copy or "cache" of the information. To manage the temporal relevance of the entries in its verification database 114, the verification and tracking system 115 maintains a current time, and applies a time stamp to each item of user information 88 and authorization information 46 received from the system controller 118.

In the exemplary system 100, the video cameras 107 record video data, which are sent via the network 113 to the network video recorder 122 to store the video data. Typically, time and date information are added to video data to enable the data to be indexed and reviewed at a later date. This information is also known as video metadata. The video analysis system 120 analyzes video data and may associate metadata to moving objects (e.g., people), numbers of moving objects, and specific users, to list a few examples.

The verification and tracking system 115 then sends the location data 109 in conjunction with the video data from the video cameras 107 to the video analysis system 120 for analysis. The video analysis system 120 typically analyzes the location data 109 with the video data from the video cameras 107 to verify that the user is a proper user. In one example, video identification information 91 such as facial image information that the video analysis system 120 determines from the video data is used to confirm that the individuals possessing the user devices 103 are the proper users 104. This safeguards against an event such as when a user device 103 for a valid employee user 104 of a business is stolen or lost, and a different individual (e.g. other valid user 104, former employee of the business, or criminal) attempts to gain access to a restricted area of the building via the same user device 103. In other examples, the video analysis system 120 analyzes the tracking information provided by the location data 109 in conjunction with the video data to determine which individuals in a scene are users (holding users devices 103) and which are non-users (not holding user devices 103).

Typical embodiments of the system 100 include display devices 117-1 to 117-n. These display devices 117-1 to 117-n could be screens of access control readers or standalone display devices (e.g., LCD screen), for example. In one embodiment, the display devices 117-1 to 117-n are wirelessly connected to the network 113. In an alternative embodiment, the display devices 117-1 to 117-n are connected via wired connections and receive power via PoE (power over Ethernet).

The display devices 117-1 to 117-n, if used, display messages to the users 104 such as "access granted", "access denied", warnings about low power conditions of the user devices 103 or warnings about emergency situations, in examples. Additionally, personalized messages may be directed towards specific users regarding personal and/or work matters. For example, a message could be generated by a supervisor attempting to locate an employee user. In another example, a message could be generated indicating that a family member and/or relative of the user are attempting to contact the user 104. These messages can be efficiently targeted at the intended recipient since the user location information 109 is known and thus it is known when they are in front of a display device 117, for example.

Typically, low power conditions of the user devices 103 are identified by the positioning units in response to the positioning units determining a signal strength of the wireless signals sent from the user devices 103, and comparing the determined signal strength to a range of expected/ threshold signal strength values maintained by the positioning units 110. The range of expected signal values additionally take into account the distance between the user device and the positioning units 110.

A fingerprint reader kiosk 106 may also be deployed in some embodiments of the system 100. In some high-security situations, users are required to periodically return to the fingerprint reader kiosk 106 and scan their fingerprint(s) to re-authenticate with the system 100. This process helps ensure that the user in possession of the fob or other user device 103 is also the registered owner of the user device 103.

While not shown in the illustrated figures, fingerprint scanners may be implemented in the fobs or mobile computing devices 103, in still other examples. In this scenario, the users 104 would not have to periodically return to the fingerprint reader kiosk 106. Rather, the users would periodically authenticate themselves via the fingerprint reader integrated within the user devices 103.

Figure 2:
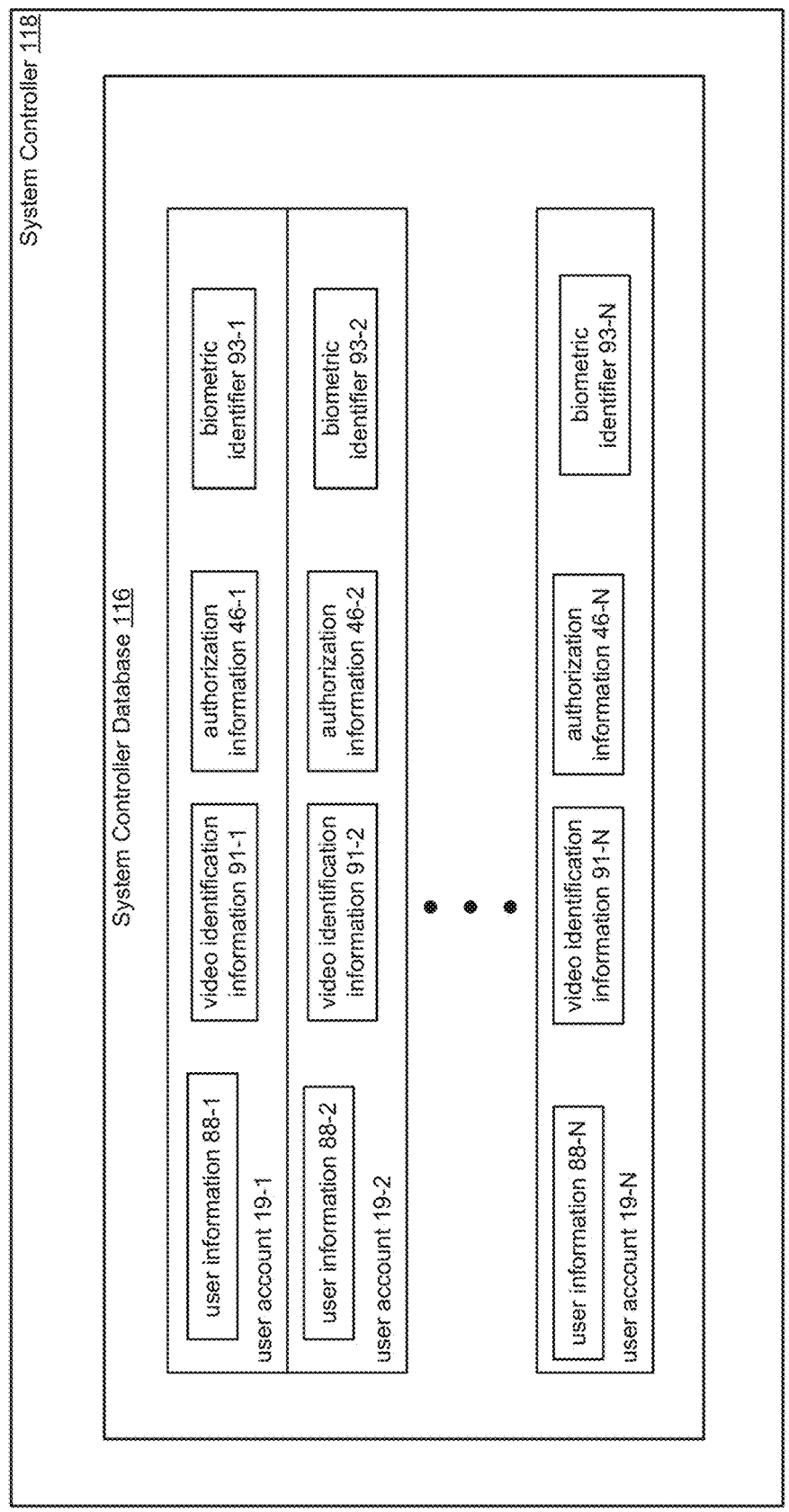
FIG. 2 is a block diagram illustrating detail for exemplary user accounts stored for each user within a system controller of the access control system, where each user account includes different types of information for identifying the users and confirming the identity of the users.

FIG. 2 shows exemplary user account records, or user accounts 19, stored for each of the users within the system controller database 116. Each user account 19 includes information such as user information 88, authorization information 46, video identification information 91, and biometric identifiers 93 for each of the users. Exemplary user accounts 19-1, 19-2, and 19-N are shown. The access control system 100 references the set of user accounts 19 to authorize users 104 at the access points 129, and to confirm the identity of the authorized users at the access points 129, in examples.

A system administrator creates an initial user account 19 for each user of the access control system 100. The system administrator and/or the user create user information 88 for each user such as a unique ID 98, and username/password combination 99. The system administrator, based on security policies, creates authorization information 46 for each user that indicates which access points 129 each user is authorized to pass through.

In another example, video identification information 91 can be stored for each user. Video identification information 91 includes physical characteristics of the users that are obtained from analyzing video data of the users. Examples of video identification information 91 include facial image information and gait information, clothing worn, and tattoos, in examples. In yet another example, biometric identifiers 93 can be created for each user 104, where biometric identifiers include fingerprints and iris scans of the user, in examples.

It is also important to note that the user accounts 19 can be stored elsewhere within the access control system 100. In one implementation, the system controller 118 can periodically send the user accounts 19 to the verification and tracking system 115 for storing the user accounts 19 to the verification database 114. In this way, the user accounts 19 within the verification and tracking system 115 act as a "local cache" of user accounts 19. Moreover, the verification and tracking system 115 can then send the user accounts 19 to the positioning unit 110 for storage to a local cache of user accounts 19 within the positioning unit 110.

Figure 3A:
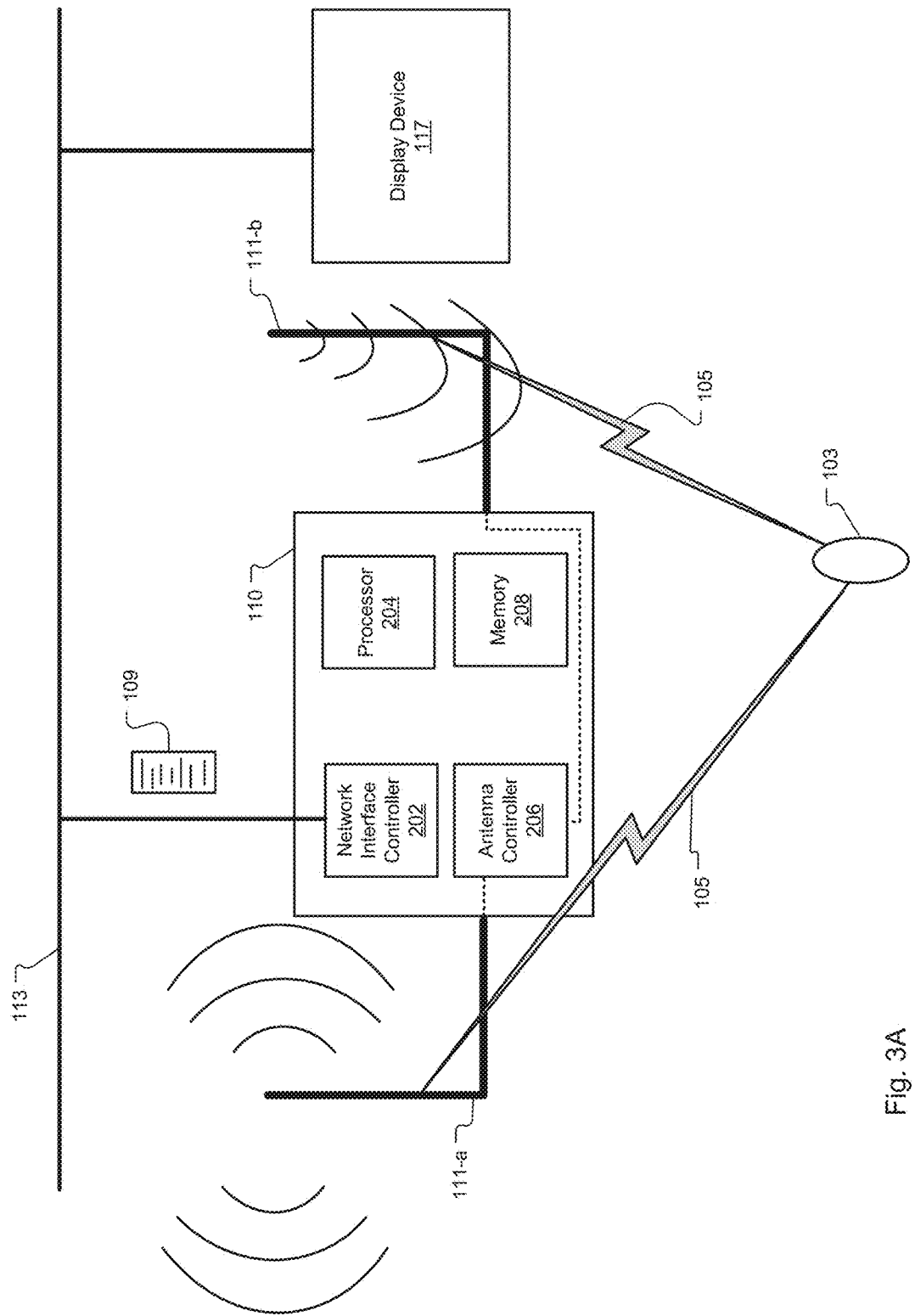
FIG. 3A is a schematic diagram illustrating a preferred embodiment of a positioning unit at an access point of a premises, where the positioning unit includes one omnidirectional antenna and one directional antenna for determining a location of an active wireless device such as a fob or mobile computing device.

FIG. 3A is a schematic diagram illustrating a preferred embodiment of the positioning unit 110, which includes at least two antennas 111-a, 111-b (e.g., one omnidirectional antenna and one directional antenna) for determining a location of a fob or other user device 103-f or mobile computing device (e.g., a smartphone 103-s). Preferably, Bluetooth Low Energy (BLE) is the wireless technology used for communications between the user devices 103 and the positioning units 110.

In a BLE-enabled system, users carry an active BLE device on their person that transmits their user information 88 including user IDs 98 to one or more BLE-enabled positioning units 110 located in different places throughout a building 102. However, the characteristics of Bluetooth signals can present challenges when determining the location of an individual relative to access points of a building 102. This especially impacts BLE because of its lower power and therefore more limited distance range as compared to standard Bluetooth signals.

When BLE receivers such as positioning units 110 are installed in buildings 102, objects and obstructions such as walls and furniture located in the vicinity of the access points can adversely affect or enhance the reception of Bluetooth signals. This is because the objects absorb, reflect and refract radio waves in different ways and in different amounts. As a result, Bluetooth signals can scatter to the point of becoming directionless. This can severely limit the distance-signal strength relationship between the user devices 103 and the positioning units 110 and therefore the ability of the positioning units 110 to locate and track the user devices 103.

To solve this problem, the positioning system 110 includes two antennas 111-a and 111-b for determining the location of a fob 103-f or mobile computing device (e.g., a smartphone 103-s) as the user devices 103. In one example, the first antenna 111-a and the second antenna 111-b are both BLE antennas. In the preferred embodiment, the first antenna 111-a is an omnidirectional antenna and the second antenna 111-b is a directional antenna. More generally, the second antenna 111-b only needs to be more directional than the first antenna 111-a. The antennas 111 detect packet data 105 broadcast by user devices 103, which are carried by the users 104 or are located on their person.

Typically, the directional BLE antenna 111-b establishes the close proximity of a user 104 to an access point such as a door 129, and the omnidirectional BLE antenna 111-a allows the system 100 to continuously monitor (e.g. track) the locations of the users 104. In one implementation, the directional antenna can receive BLE broadcasts from user devices 103 located typically within a 3 foot by 3 foot region or threshold area 131 in front of a door access point 129. The door access point 129, in turn, enables access to a restricted area of a building 102. In contrast, the omnidirectional antenna 111-b can receive BLE broadcasts sent from user devices 103 in all locations/directions. Typically, the omnidirectional antenna 111-b can receive BLE broadcasts sent from user devices 103 located beyond the threshold area 131 but that are also still within the signal range of the omnidirectional antenna 111-b.

Using positioning techniques (e.g., time of flight to each antenna, triangulation with other positioning units, and/or signal strength calculations), the positioning unit 110 is able to determine the location of the user devices 103. Additionally, the use of an omnidirectional antenna 111-a and a directional antenna 111-b enable finer granularity in the location calculations since the directional antenna 111-b can be used to generate finer location information within a specific region such as a door threshold.

In the illustrated example, the positioning unit 110 includes a network interface controller 202, a processor 204, an antenna controller 206, and memory 208. The network interface controller 202 provides an interface with the network 113. This enables the positioning unit 110 to communicate with the verification and tracking system 115 and the door controllers 112-1 to 112-n.

Figure 3B:
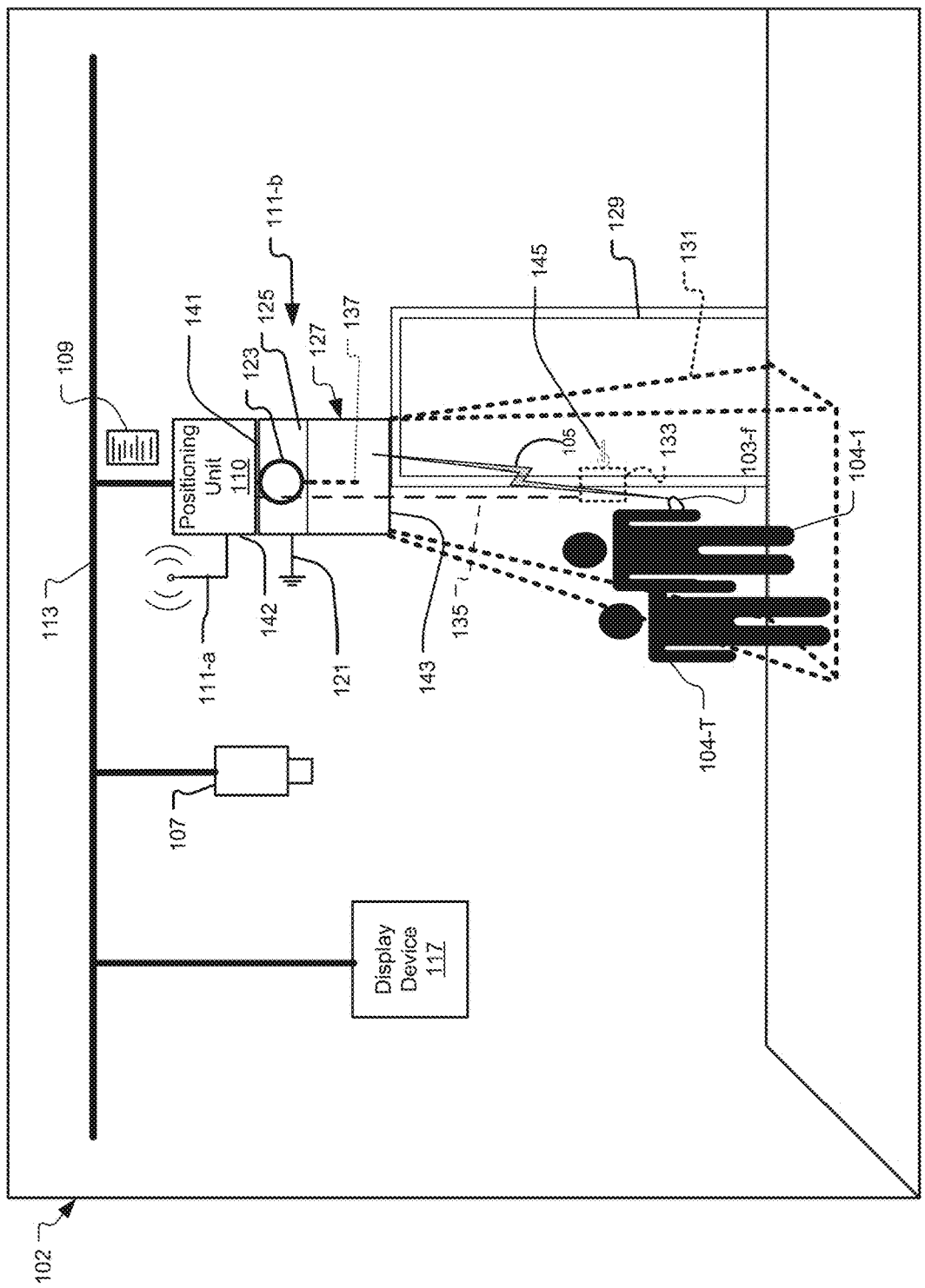
FIG. 3B is a schematic diagram illustrating an embodiment of the positioning unit with an omnidirectional antenna that is housed within an enclosure to create a directional antenna, where the positioning unit is located near an access point of the premises, and also illustrating a non-authorized user attempting to "tailgate" or pass through the access point with an authorized user.

FIG. 3B is a schematic diagram illustrating another embodiment of the positioning unit 110 that also includes an omnidirectional antenna 111-a and a directional antenna 111-b. The directional antenna 111-b comprises an omnidirectional antenna 137 that is housed within an enclosure 127, e.g., antenna horn, to form the directional antenna 111-b. The directional antenna 111-b is preferably oriented towards a door striker 133 of a door 129 access point. The door striker 133 is typically integrated with or located adjacent to a door handle 145 of the door 129.

In the illustrated example, the positioning unit 110 includes the omnidirectional antenna 111-a mounted to the exterior surface 142 of a housing of the positioning unit 110 to continuously monitor the locations of users 104. Additionally, a door striker 133 is electrically coupled to the positioning unit 110 via a connection (e.g., universal serial bus) 135, which is typically installed within the walls of the building 102.

The directional antenna 111-b is created, in one implementation, by housing the omnidirectional antenna 137 within a grounded (e.g., ref. numeral 121) partial Faraday enclosure (enclosure) 127 of the positioning unit 110 to create directionality. In one example, the enclosure 127 is fabricated from aluminum, but other conductive materials known in the art could also be used. In a typical implementation, the enclosure 127 includes copper shielding (e.g., copper mesh) 125. Preferably, the shielding and enclosure are designed to shield the omnidirectional antenna 137 from 2.4 GHz signals arriving from the front, back, top, and sides of the enclosure 127. In another implementation, the directional antenna is a patch array antenna, where the patches in the array are built using microstrip technology.

A bottom 143 of the enclosure 127 is left open to create an aperture and allows the entrance of wireless signals such as 2.4 GHz Bluetooth signals. The waves travel upward from the bottom 143 of the enclosure 127 towards the second omnidirectional antenna 137, which is preferably mounted at a top 141 of the enclosure 127. Typically, the length of the enclosure 127 is adjustable based on the required/desired angle of incidence for the threshold area 131 near the locked door 129.

More generally, the enclosure 127 comprises a flaring, preferably, metal waveguide that has a typically rectangular, square or circular aperture and a generally pyramidal or conical shape with the omnidirectional antenna 137 located at or near the vertex. The aperture is preferably oriented towards a door striker 133 of a door 129 access point. In some embodiments, two omnidirectional antennas 137 are located at the vertex at right angles to each other to avoid polarization sensitivity.

In a current embodiment, the enclosure 127 is approximately 5 inches wide and 7 inches long (13 centimeters by 18 centimeters) or less and 2 inches (5 centimeters) in depth, or less. Preferably, these dimensions create an adaptive waveguide for 2.4 GHz Bluetooth signals. In alternative embodiments, the dimensions (e.g., length, width, depth) of the enclosure 127 and the shape of the aperture (e.g., opening) of the enclosure 127 may be altered depending on the required/desired angle of incidence for the threshold area 131. Additionally, the dimensions may also be adjusted depending on a desired operating frequency of the wireless technology of the second antenna 111-b.

In yet another alternative embodiment, the enclosure 127 is fabricated with extendable and/or collapsible walls and/or hinged sections (not shown) to allow the aperture to be adjusted, typically at the time of installation.

Generally, the aperture of the enclosure 127 is designed to allow the passing of a 2.4 GHz wave upward from the bottom of the enclosure 127 to the omnidirectional antenna 137 and then to a receiver (e.g., Bluetooth receiver), which is installed within the enclosure 127 and mounted to the top wall of the enclosure 127 or adjacent to the enclosure. Typically, the Faraday enclosure 127 does not completely block radio waves from the sides and top of the enclosure. The waves from the sides and top of the enclosure 127 are only partially attenuated. In one embodiment, the enclosure 127 and omnidirectional antenna 137 are attached to a gimbal 123, which allows for precise adjustment of the directionality of the antenna such that its aperture is directed at the threshold area 131.

In a typical implementation, the threshold area 131 is defined by the projected aperture of the directional antenna 111-b and is approximately 3 feet (or approximately 1 meter) deep (e.g., distance out from the door) and includes a width of that typically ranges between 3-6 feet (e.g., 1-2 meters). Additionally, the threshold area 131 is generally installed off-center from the door 129 to account for an opening and closing arc of the door 129, often being centered on the door handle 145.

In other examples, where the access point is a hallway, the projected aperture and thus the threshold area 131 extends laterally across the hallway so that users must pass through the threshold area to transit the access point.

In a preferred embodiment, the positioning unit 110 accounts for signals that are reflected off of surfaces and objects (e.g., walls, furniture, people) as well as signals from devices on different floors and/or behind the door 129, which leads to the restricted area. The positioning unit 110 must account for signals coming from other areas of the building 102 because the signals in the 2.4 GHz band are able to travel through walls and floors. Moreover, the positioning unit 110 must also ensure that the door striker 133 is not accidentally unlocked due to an authorized user 104 walking on a different floor.

Also in FIG. 3B, a user 104-T is standing within the threshold area 131 of the access point with user 104-1. The positioning unit 110-1 determines that both user 104-1 and user 104-T are within the threshold area 131. Because user 104-T is not carrying a user device 103, the system cannot authorize user 104-T, and therefore the user 104-T is a non-authorized user. User 104-T is likely attempting to tailgate through the access point 129 with user 104-1.

FIG. 3C is a schematic diagram illustrating another embodiment of the positioning unit 110. Instead of using an omnidirectional antenna within an enclosure to form the directional antenna 111-b, however, native directional antenna technology is used.

In one example, the directional antenna 111-b is a horn antenna. Generally, horn antennas include a waveguide to collect radio waves from a given direction, characterized by horizontal and vertical beam widths, for reception and detection.

In another example, the directional antenna 111-b is a flat panel antenna, a fixed phased array antenna, a phase-array antenna, or a patch-array antenna. These are directional antennas that can be flush mounted in the wall or ceiling.

As in FIG. 3B, user 104-T is standing within the threshold area 131 of the access point with user 104-1, in FIG. 3C. Here, however, user 104-T is carrying a stolen user device 103-s'. The user device 103-s' was once associated with a valid user, but its user information 88 is no longer valid for security reasons. As a result, user 104-T is a non-authorized user. As in FIG. 3B, non-authorized user is likely attempting to tailgate through the access point 129 with user 104-1.

Figure 4:
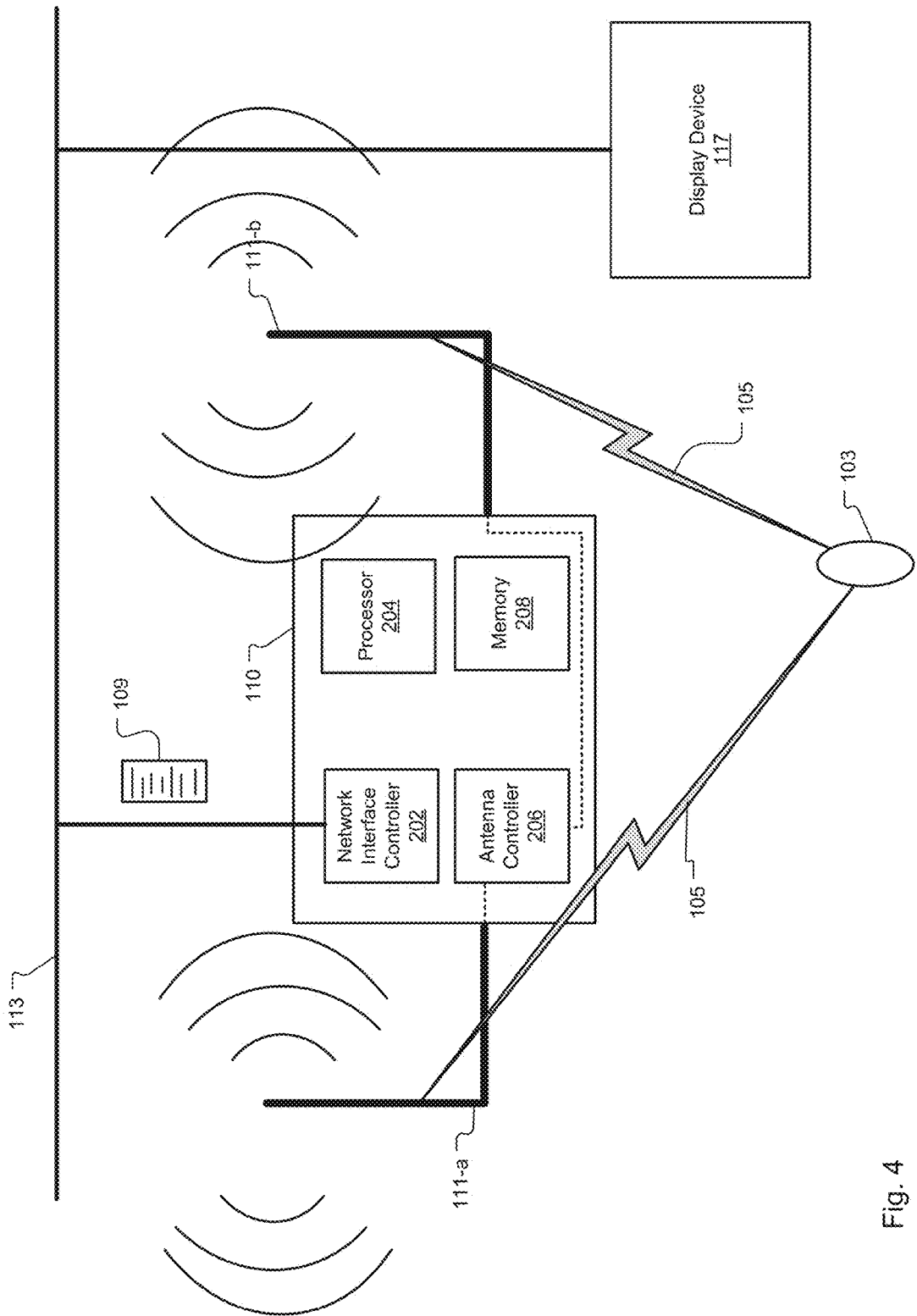
FIG. 4 is schematic diagram illustrating an alternative embodiment of the positioning unit, which includes two omnidirectional antennas.

FIG. 4 is schematic diagram illustrating an alternative embodiment of the positioning unit 110. In this embodiment, the positioning unit 110 includes two omnidirectional antennas. This embodiment uses triangulation based on the time of receipt of the wireless signals from the user device 103 to determine the range of the user device 103 from the positioning unit 110.

FIG. 5 shows component interactions for an exemplary implementation of the system 100. In this implementation, the verification and tracking system 115 sends a door signal to the door controller 112 to unlock the door access point 129 in response to the verification and tracking system 115 authorizing the user 104 after the user has entered the threshold area 131.

First, in step 402, user accounts 19 including user information 88 and authorization information 46 are sent from the system controller 118 to the verification and tracking system 115 via the network 113. This updates a local "cache" of user accounts 19 including user information 88 and authorization information 46 within the verification database 114 of the verification and tracking system 115. The system controller 118 periodically updates the cache of user accounts 19 on the verification and tracking system 115 at regular intervals (e.g., daily, weekly). Locally storing the user accounts 19 to the verification and tracking system 115 enables faster operation and allows the system 100 to continue to function if communications are lost with the system controller 118.

In step 404 and generally on a continuous/periodic basis, the user device 103 broadcasts wireless signals including user information 88, and the positioning unit 110 detects the wireless signals and extracts the user information 88. Additionally, the positioning unit 110 calculates the location of the user device 103, and determines if the user device (and therefore if the user) is in the threshold area 131, in step 405. The user information 88 and the location data 109 are then sent to the verification and tracking system 115 for authentication in step 406. In examples, the user device 103 can have integrated BLE capability, or include an external BLE-enabled device such as a BLE dongle that plugs into a USB port of a smartphone user device 103-s, in examples.

According to step 408, the verification and tracking system 115 can request an update to its local cache of user accounts 19 when stale. The information 88/46 within the user accounts 19 is stale if its time stamp indicates that it is older than a predetermined threshold value (e.g. one hour) as compared to the current time, in one example.

In step 410, the verification and tracking system 115 then determines if the user 104 is as authorized user for the access point 129. For this purpose, the verification and tracking system 115 first compares the user information 88 forwarded from the positioning unit 110 to the stored cache of user accounts 19. If required, the verification and tracking system 115 may confirm user status and account information with the system controller 118 if the users' information 88 have not been previously sent to the verification and tracking system 115. Upon finding a match, the verification and tracking system 115 then executes a lookup of the matched user information 88 against the locally stored authorization information 46 in the cache. If the local copy of the authorization information 46 indicates that the user is allowed access to the access point near the positioning unit 110, the verification and tracking system 115 identifies the user 104 as an authorized user for the access point. In one implementation, this occurs when the matched user information 88 is referenced within the authorization information 46.

In step 412, if the user is an authorized user, and the user's user device 103 was also determined to be within a threshold area 131, then the verification and tracking system 115 sends a door control signal to the door controller 112 to enable access to the access point of the restricted area (e.g., unlock the door 129 access point). In the event that there are multiple authorized users also within close proximity of the door 129, then the door controller 112 keeps the door 129 unlocked until all users have entered the restricted area.

Additionally, while not illustrated in the figure, the verification and tracking system 115 may also send "Access granted" messages to be displayed on display devices 117 to provide visual indications to the users, in some examples.

In should be noted in some embodiments, several positioning units will communicate with the same verification and tracking system. In other cases, however, the verification and tracking system is integrated together with the positioning unit, in the same box, possibly.

Figure 6A:
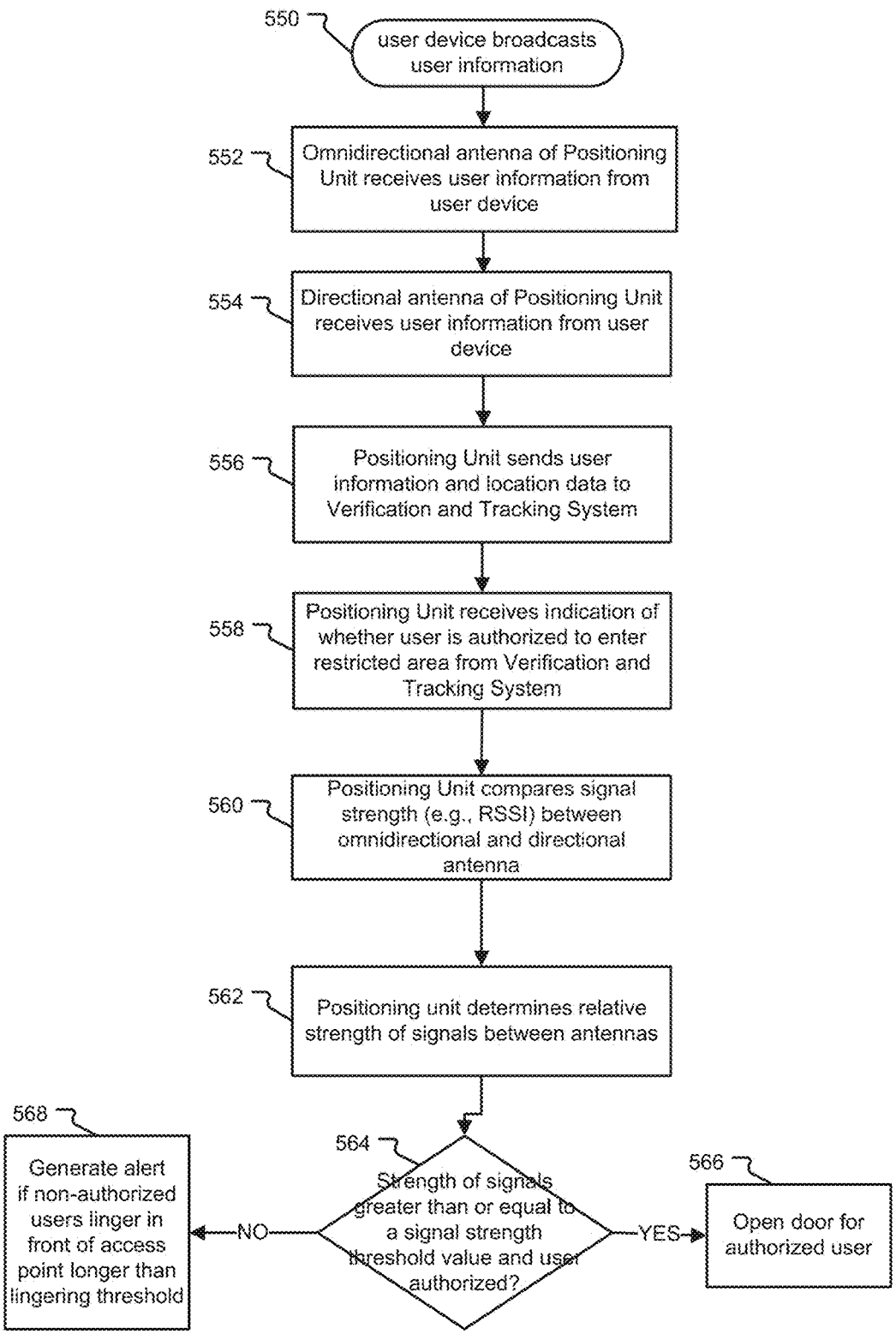
FIG. 6A is a flowchart illustrating how the positioning unit tracks a user by determining the location of a user based on the signal characteristics of a mobile active wireless user device carried by the user.

FIG. 6A is a flowchart illustrating how the positioning unit 110 determines the location of a user based on the signal characteristics of the mobile broadcasting user device 103.

In a typical implementation, the positioning unit 110 determines if the origin of the signal (e.g., the fob 103-f currently broadcasting its user information) is directly beneath the positioning unit 110 and enclosure 127 and in the volumetric region above the threshold area 131 defined by the aperture of the directional antenna 111-b. This is accomplished by comparing the signal strength of the two antennas (i.e., the omnidirectional antenna and the directional antenna). By comparing the strength of the received wireless signals between the two antennas 111-a, 111-b, the positioning unit 110 determines if the user devices 103 and thus the users 104 are in close proximity to the door 129 (i.e., in the threshold area 131).

For example, wireless signals sent from a user device within the threshold area 131 will likely be detected by both the primary (i.e. omnidirectional 111-a) and directional antenna 111-b and will be among the highest in signal strength. Because each of the antennas have received a wireless signal from the same device with a high signal strength as compared to threshold/expected values, the positioning unit can infer that the user device 103 is likely located within the threshold area 131. In addition, wireless signals that are relatively the same in strength as determined by the antennas 111-a/111-b but each have a very low or weak value for their signal strength likely means that the user device 103 is also within the threshold area 131. In one example, this could occur when the user device 103 is not within clear line of sight with the positioning unit 110, such as when placed in a rear pocket of pants worn by the user 104 or when placed in a backpack worn by the user 104, in examples, due to the resultant radio frequency shielding. Finally, signals sent from a user device located perhaps 3 or 15 meters or more away from the positioning unit 110 will either be very weak or undetected by the directional antenna 111-b, but will likely be detected by the omnidirectional antenna 111-b. This is because the signals are well within the signal range of the omnidirectional antenna 111-b. Because the directional antenna 111-b receives a weak signal or no signal and the omnidirectional antenna 111-a receives a signal with a nominal strength after comparing its signal strength to threshold/expected values, the positioning unit can infer that the user device 103 is likely located away from the threshold area 131.

In step 550, the user device 103 broadcasts user information 88. Next, the primary antenna (functioning as an omnidirectional antenna 111-a) of the positioning unit 110 receives user information 88 from the user device 103 in step 552. The directional antenna 111-b of the positioning unit 110 also receives user information from the user device 103 in step 554.

The positioning unit 110 sends the user information 88 and location data 109 to the verification and tracking system 115 in step 556. In step 558, the positioning unit 110 receives an indication of whether the user 104 is authorized to enter the restricted area from the verification and tracking system 115.

In step 560, the positioning unit 110 compares the signal strength between the omnidirectional 111-a antenna and the directional antenna 111-b. Next, the positioning unit 110 determines the relative strength of the signals between the antennas in step 562.

In step 564, the positioning unit 110 determines if the signal strength is greater than or equal to a predetermined signal strength threshold value. The relative strength of the signals between the antennas is indicative of the user being in the threshold and whether the user 104 was authorized by the verification and tracking system 115. In general, as the fob 103 moves toward the threshold area 131 in front of door access point 129, the signal strength approaches its maximum value and the difference in signal strength received by the two antennas 111-a, 111-b diminishes. Once the signal strength meets or exceeds the predetermined signal strength threshold value and/or the signal strength difference between antennas 111-a, 111-b has decreased below a difference threshold, then the user device 103 (and therefore the user 104) are determined to be within the threshold area 131 in front of the door 129.

If step 564 resolves to true, then the positioning unit 110 sends a signal to the door controller 112 to unlock the door 129 for the authorized user 104 in step 566. In some examples, the positioning unit waits to unlock the door until the authorized user 104 has remained stationary in the threshold area for a wait time of greater that a second or two seconds or more. This ensures that the door is not unlocked simply because an authorized user walked in front of or simply passed-by the door.

Otherwise, the positioning unit 110 generates an alert if the non-authorized user 104 lingers in front of the door 129 for longer than a predefined lingering threshold value, according to step 568. A typical lingering threshold value is 5 seconds. Sometimes this lingering threshold value is greater and in some cases a lower lingering threshold value is used.

Figure 6B:
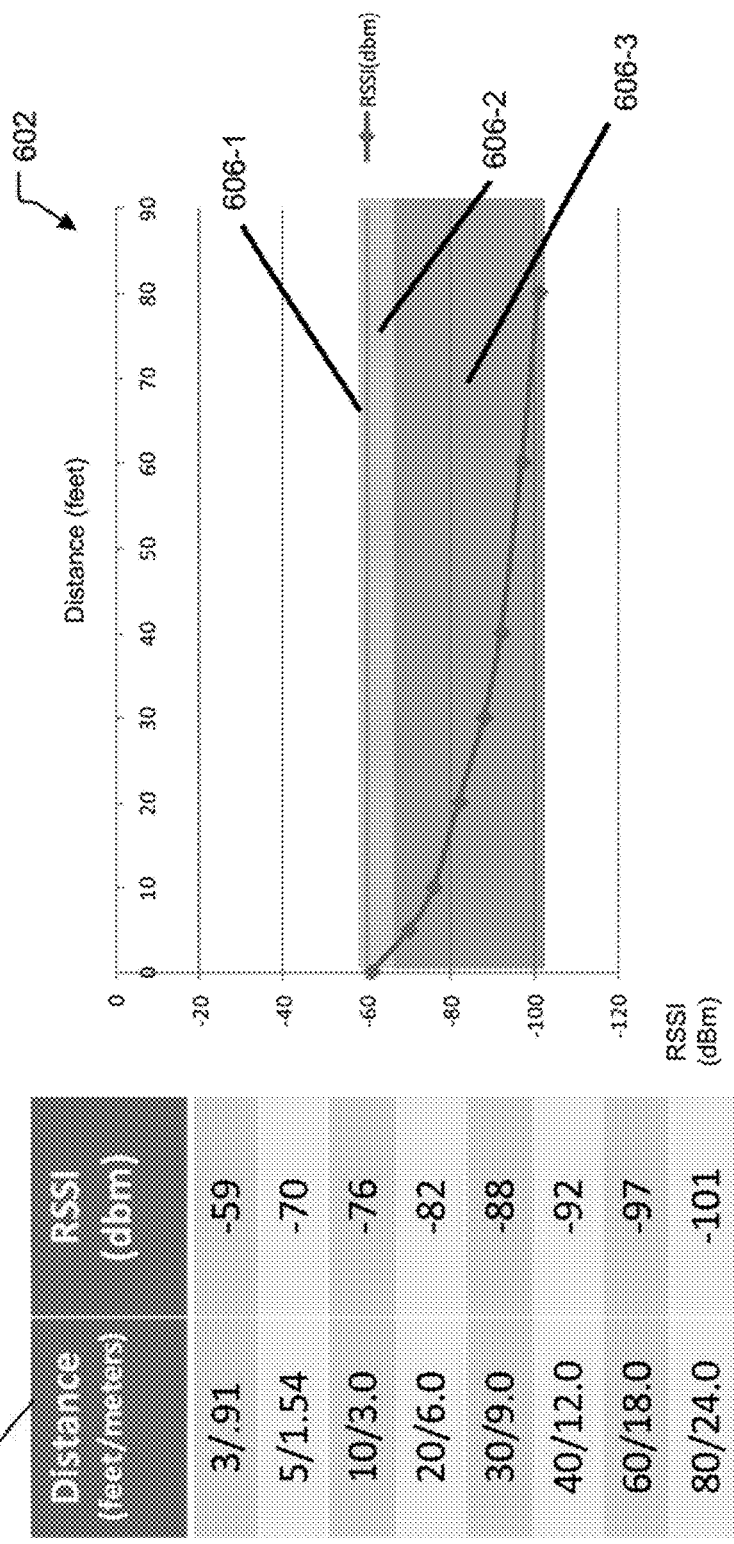
FIG. 6B shows both a graph of Received Signal Strength Indication (RSSI) vs. distance values plotted for a typical BLE user device communicating with a positioning unit, and an associated table of exemplary RSSI vs distance values from the graph, according to principles of the present invention.

FIG. 6B shows both a graph 602 of Received Signal Strength Indication (RSSI) values as a function of distance, for iBeacon and BLE112 hardware implementations of BLE, and a table 604 of exemplary RSSI vs. distance values from the graph 602. The RSSI values are in units of Decibel-milliwatts (or dbm), where the distance of the user devices 103 to the positioning unit 110 is measured in feet.

The graph 602 plots the RSSI values for both BLE112 and iBeacon-equipped iPhone user devices 103 communicating with a positioning unit 110 according to principles of the present invention. iPhone and iBeacon are registered trademarks of Apple, Inc. The graph 602 has a maximum measured distance of 27 meters. According to the iBeacon specification, wireless signals sent via iBeacon are calibrated to −59 dbm at 1 meter. Other reference parameters include a BLE specified design range of 50 meters, a BLE112 sensitivity of (−92) dbm, and an iPhone sensitivity of (−105) dbm.

The graph 602 also includes three zones 606. The first zone is the immediate zone 606-1. The immediate zone 606-1 typically encompasses the threshold area 131 and has a range of 0 to 3 feet from the door access point 129 (or approximately 0 to 1 meter). Generally, very accurate position information is obtained in the immediate zone 606-1. The second zone is the near zone 606-2. The range of the near zone 606-2 is approximately 7 to 10 feet (or 1 to 3 meters). Typically, accurate position information can also be obtained in the near zone 606-2. Finally, the third zone is the far zone 606-3, which extends from approximately 10 feet to 80 feet (approximately 3 to 24 meters). In the far zone 606-3, the positioning unit 110 is able to identify the presence of user devices 103 (or users), but the positioning information is less reliable in this zone.

Figure 7:
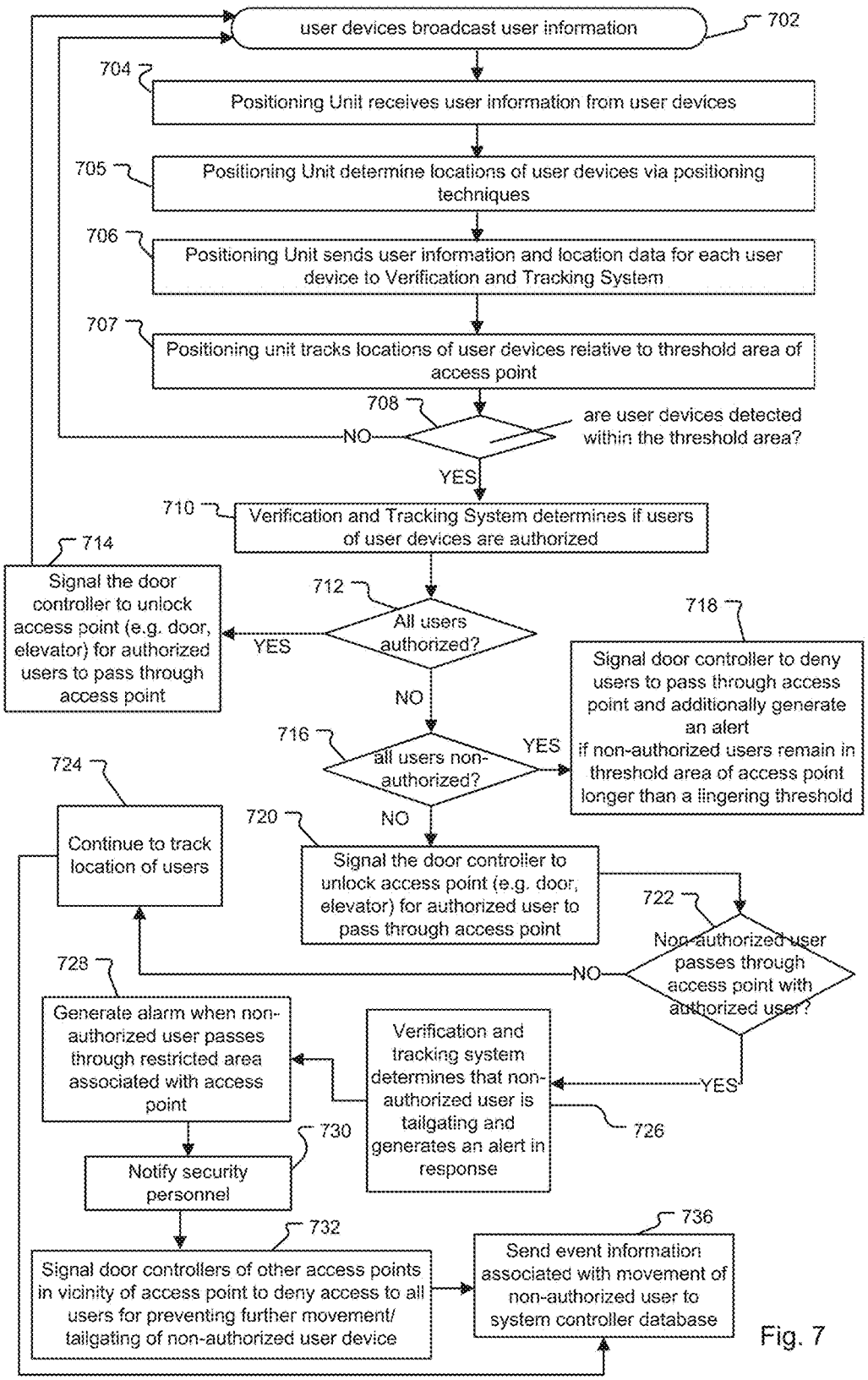
FIG. 7 is a flowchart illustrating how the access control system generates alerts or alarms if users are determined to be tailgating through an access point.

FIG. 7 is a flow diagram for one embodiment of the access control system, which describes how the access control system 100 generates alerts or alarms if non-authorized users are determined to be "tailgating."

In step 702, the user devices 103 broadcast user information as packet (BLE) data. Next, the positioning unit 110 receives the user information 88 (i.e., packet data) from user devices in step 704. The positioning unit 110 determines locations of the user devices 103 via the positioning techniques in step 705.

In step 706, the positioning unit 110 sends the user information 88 and the location data 109 for each of the user devices 103 to the verification and tracking system 115. Next, the positioning unit 110 and the tracking system 115 track the locations of user devices 103 relative to the threshold area 131 of the access point 129 in step 707.

In step 708, the positioning unit 110 determines if any user devices 103 are detected within the threshold area 131. If no user devices are detected within the threshold area 131, the method transitions back to step 702. Otherwise, the method transitions to step 710.

According to step 710, the verification and tracking system 115 determines if the users of the user devices 103 are authorized to pass-through or transit the access point. Additionally, while not illustrated in the figure, the verification and tracking system 115 may optionally validate the user devices 103 in step 710. A validated user device is a valid user device 103 in the possession of the correct user, which is designed to operate with the system. A non-validated user device is a fob or other device belonging to former employee (which has been de-authorized) or possibly a fob intended for another system or a fob that lacks proper encryption, to list a few examples.

In step 712, the verification and tracking system 115 determines if all users are authorized users. If all users are authorized users, the verification and tracking system 115 sends a signal to the door controller 112 (or striker 133) to unlock or otherwise provide passage through the access point 129 for the authorized users. In other examples, gates or door might be opened to pass through the access point (e.g. door, elevator) in step 714. This enables the authorized users to pass through the access point 129, and to then enter into the restricted area 153 of the building 102 associated with the access point 129. Otherwise, the method transitions to step 716.

According to step 716, the verification and tracking system 115 then tests to determine if all of the users are non-authorized users. If this is true, the method transitions to step 718, and signals a door controller 112 of the access point 129 to deny the users to pass through the access point 129. In other examples, gates or elevator door might be closed. In addition, the tracking system 115 generates an alert if non-authorized users remain within the threshold area 131 of the access point 129 for a length of time that exceeds a lingering threshold value. Typically, this alert is a warning that is sent to security personnel to indicate that a non-authorized user is in the vicinity of an access point 129.

Otherwise, the method transitions to step 720, which represents a state in which at least one of the user devices 103 of the users has been authorized (and therefore the user 104 carrying the user device is authorized), but any of the other users within the threshold area 131 are non-authorized users.

In step 720, though not all users are authorized users, the verification and tracking system 115 still signals the door controller 112 to unlock the access point (e.g. door, elevator) for the authorized user to pass through the access point 129, according to one implementation. The positioning unit 110 then determines if a non-authorized user (i.e. a tailgating user) is passing through the access point 129 with the authorized user in step 722. If this tests as true, the method transitions to step 726. Otherwise, the method transitions to step 724.

In step 726, because the positioning unit 110 determined that a non-authorized user passed through the access point 129 with an authorized user, the verification and tracking system 115 determines that the non-authorized user is tailgating and generates an alert in response. This alert is typically a warning sent to, for example, security personnel, to indicate that a non-authorized user is potentially about to pass through a restricted area 153.

There are two common scenarios for tailgating. In the first scenario, one or more users are authorized, and one or more other users do not have user devices and are thus not authorized, as depicted in FIG. 3B. In this scenario, the non-authorized users simply follow behind the authorized users. In the second scenario, one or more users are authorized and one or more other users are carrying user devices which are not authorized to pass through the access point 129, as depicted in FIG. 3C.

Upon conclusion of step 726, the verification and tracking system 115 generates an alarm if the non-authorized user then passes through the restricted area 153 associated with the access point 129 in step 728. To determine that the non-authorized user has passed through the restricted area 153, in one example, an additional positioning unit 110 can be placed near the opposite side of the access point 129, such as within the restricted area 153 of the building 102 to which the access point provides entry and/or exit controls. This is illustrated in FIG. 8.

Figure 8:
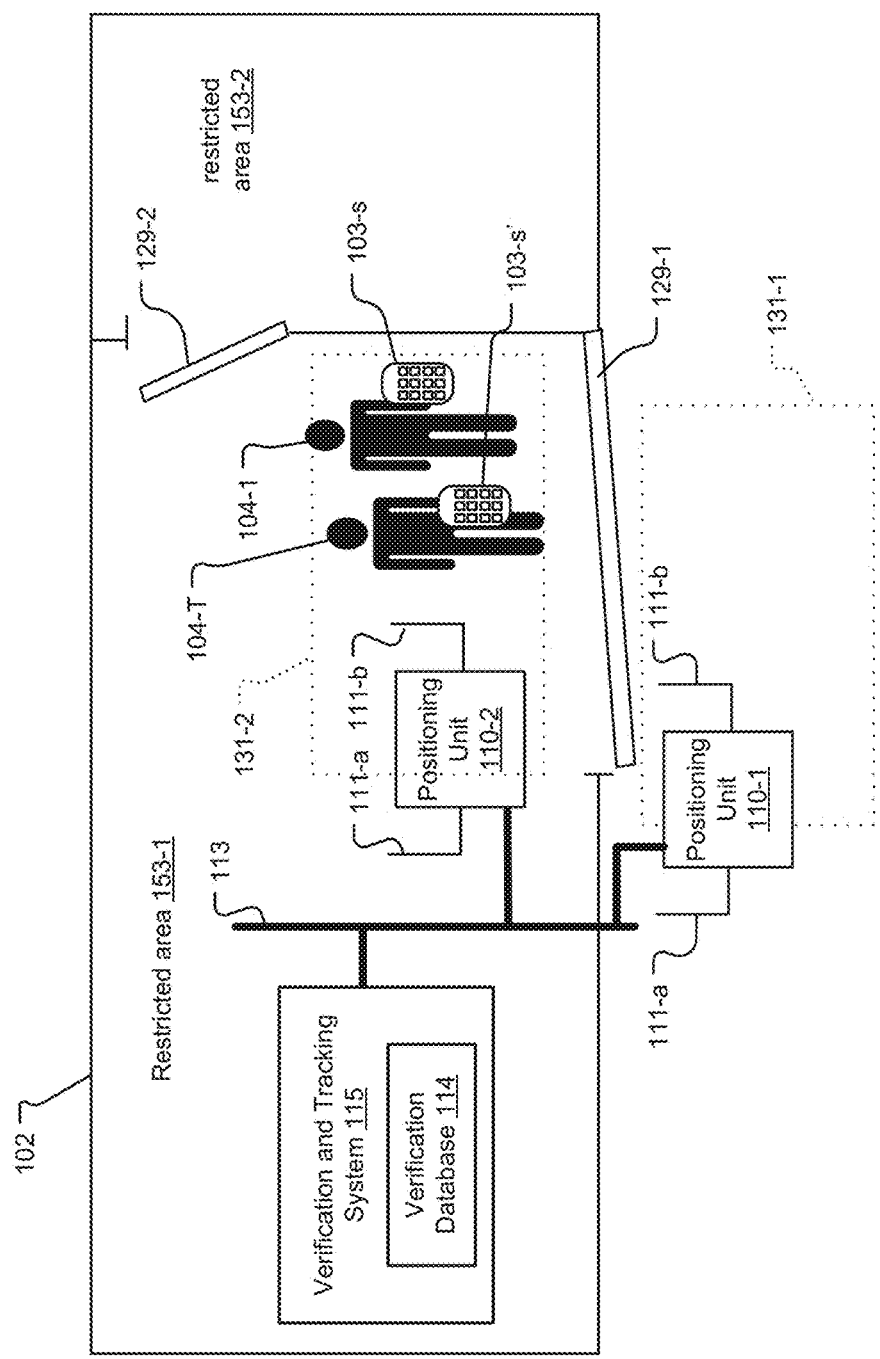
FIG. 8 is a schematic diagram illustrating how the access control system can utilize positioning units located on opposite sides of an access point, such as within a building or other premises, to determine whether tailgating users have then passed through a restricted area of the building associated with the access point.

In FIG. 8, access point 129-1 controls external access to restricted area 153-1 of a building 102. Access point 129-2 controls internal access to restricted area 153-2 within the building 102. Positioning unit 110-1 tracks locations of users relative to threshold area 131-1 in front of access point 129-1 (e.g. door). Positioning unit 110-2 is located on the opposite side of the access point 129-1 and tracks locations of users relative to threshold area 131-2 within restricted area 153-1. Positioning unit 110-1 and 110-2 are also connected to the verification and tracking system 115 via the data network 113.

Positioning unit 110-1 determines that non-authorized user 104-T carrying non-authorized user device 103-s' has passed through the access point 129-1 with an authorized user 104-1 carrying user device 103-s. As a result, in accordance with the method of FIG. 7, the access point 129-1 has been unlocked to enable the authorized user 104-1 (and the non-authorized user 104-T) to pass through the access point 129-1. Also in accordance with the method of FIG. 7, the verification and tracking system 115 determines that the non-authorized user 104-T is tailgating, and generates an alert in response.

Positioning unit 110-2 then determines that non-authorized user 104-T has passed through restricted area 153-1, because positioning unit 110-2 has detected user device 103-s' within threshold area 131-2. Positioning unit 110-2 sends an indication of this event over the data network 113 to the verification and tracking system 115.

Returning to FIG. 7, upon conclusion of step 728, security personnel can also be notified in step 730. Next, the verification and tracking system 115 denies access to other access points (e.g., escape routes) in the vicinity of the access point to prevent further movement of the non-authenticated user in step 732. Step 732 is further illustrated with reference to FIG. 8, below.

In FIG. 8, because the verification and tracking system 115 has determined that non-authorized user 104-T has passed through restricted area 153-1, the verification and tracking system 115 signals door controllers 112 of other access points 129-2 in the vicinity of access point 129-1 to deny access for all users to the other access points 129-2, as a security precaution. This will prevent further tailgating attempts by user 104-T and will restrict their movement in the building 102. The verification and tracking system 115 also sends an alarm in response to determining that the non-authorized user 104-T passed through restricted area 153-1.

Returning to FIG. 7, upon conclusion of step 732, the verification and tracking system 115 sends event information to the system controller 118 to be stored in the system controller database 116 in step 736.

Finally, in step 724, because tailgating was not determined, the verification and tracking system 115 continues to track the location of the non-authorized user 104, and then sends event information associated with the movement of the non-authorized user to the system controller database 116 of the system controller 118 in step 736. In one example, this enables support personnel to reference historical information associated with movement of non-authorized users near access points 129.

Figure 9:
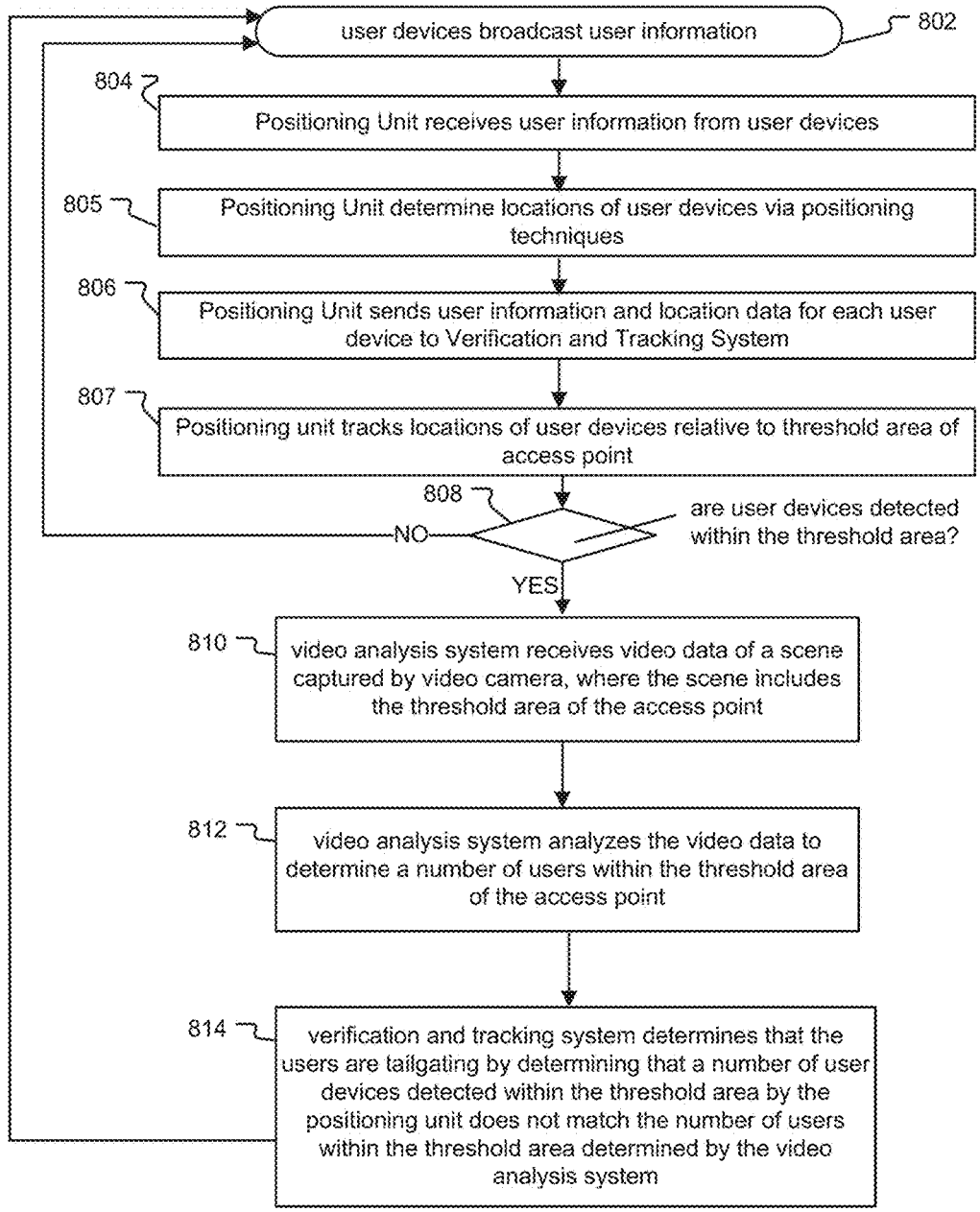
FIG. 9 and FIG. 10 are flowcharts that show different methods for how the access control system can utilize video data from video cameras to determine whether users are tailgating through an access point.

FIG. 9 shows one embodiment of the access control system for determining whether users are tailgating through an access point, based upon analyzing video data of a scene that includes users when the users are located within a threshold area 131 of an access point 129. The video data is generated from video cameras 107 which are positioned near the access point 129.

In step 802, user devices 103 broadcast user information 88. According to step 804, a positioning unit 110 receives user information 88 from the user devices 103. In step 805, the positioning unit 110 determines locations of user devices via positioning techniques. Then, in step 806, the positioning unit 110 sends user information 88 and location data 109 for each user device to the verification and tracking system 115.

The positioning unit 110, in step 807, tracks locations of the user devices 103 relative to the threshold area 131 of the access point 129. Then, if the positioning unit 110 detected the user devices 103 within the threshold area 131 in step 808, the method transitions to step 810. Otherwise, the method transitions back to step 802.

In step 810, a video analysis system 120 receives video data of a scene captured by a video camera 107, where the scene includes the threshold area 131 of the access point 129. In step 812, the video analysis system 120 analyzes the video data to determine a number of users within the threshold area 131 of the access point 129. Then, in step 814, the verification and tracking system 115 determines whether the users 104 are tailgating. The verification and tracking system 115 determines that the users 104 are tailgating by determining that a number of user devices 103 detected within the threshold area 131 by the positioning unit 110 does not match the number of individuals within the threshold area determined by the video analysis system 120.

Figure 10:
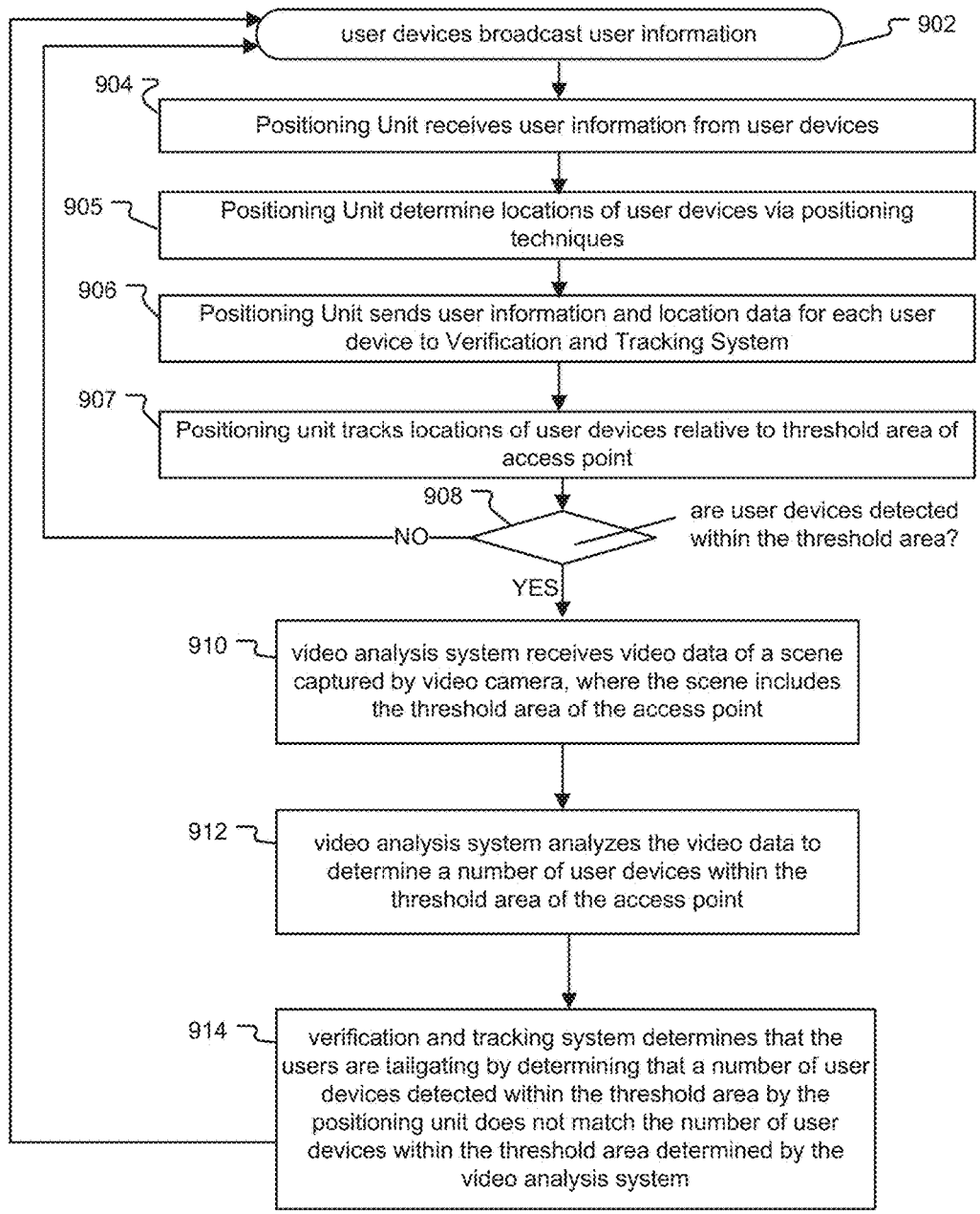

FIG. 10 shows another embodiment of the access control system for determining whether users are tailgating through an access point, based upon analyzing video data of a scene. As in FIG. 9, the video data includes users when the users are located within a threshold area 131 of an access point 129. Steps 902, 904, 905, 906, 907, 908, and 910 are identical to steps 802, 804, 805, 806, 807, 808, and 810, respectively.

Unlike in FIG. 9, however, the video analysis system 120 in step 912 analyzes the video data to determine a number of user devices 104 within the threshold area 131 of the access point 129. Then, in step 914, the verification and tracking system 115 determines whether the users 104 are tailgating. The verification and tracking system 115 determines that the users 104 are tailgating by determining that a number of user devices 103 detected within the threshold area 131 by the positioning unit 110 does not match the number of user devices within the threshold area determined by the video analysis system 120.

While this invention has been particularly shown and described with references to preferred embodiments thereof, it will be understood by those skilled in the art that various changes in form and details may be made therein without departing from the scope of the invention encompassed by the appended claims.

What is claimed is:

1. An access control system for monitoring an access point, comprising:
a system controller;
a positioning unit for tracking locations of users carrying user devices relative to the access point based on wireless signals from the user devices, the positioning unit including antennas that receive packet data from the user devices of the users, the positioning unit communicating with the system controller; and
wherein the access control system determines whether the users are authorized to pass through the access point based on the wireless signals from the user devices and determines whether non-authorized users are tailgating through the access point; and
wherein in response to the access control system determining that all of the users are non-authorized, the access control system generates an alert in response to determining that the non-authorized users remain within a threshold area of the access point for longer than a predetermined lingering threshold value.

2. The system of claim 1, wherein the positioning unit detects the wireless signals from the user devices and determines whether the wireless signals are originating from a threshold area of the access point.

3. The system of claim 2, wherein the positioning unit includes at least one directional antenna for determining whether the wireless signals are originating from the threshold area.

4. The system of claim 3, wherein the positioning unit also detects the wireless signals from the user devices using an omnidirectional antenna.

5. The system of claim 1, wherein in response to the access control system determining that all of the users are non-authorized, the access control system denies non-authorized users access through the access point.

6. The system of claim 1, wherein the access control system determines whether non-authorized users are tailgating through the access point in response to the positioning unit detecting that two or more user devices are first located within a threshold area of the access point, the access control system determining that at least one of the users is not an authorized user, and the positioning unit then detecting that at least one non-authorized user has passed through the access point with at least one authorized user.

7. The system of claim 1, wherein the access control system generates an alarm upon determining that a non-authorized user has tailgated through the access point.

8. The system of claim 7, wherein in response to the access control system determining that the non-authorized user has passed through the access point, the access control system signals door controllers of other access points in the vicinity of the access point associated with the restricted area to deny the non-authorized users to pass through the other access points.

9. The system of claim 1, further comprising:
at least one video camera that captures video data of a scene that includes a threshold area of the access point; and
a video analysis system that analyzes the video data to determine a number of user devices within a threshold area of the access point, wherein the access control system determines that the users are tailgating by determining that a number of user devices detected within the threshold area by the positioning unit does not match the number of user devices within the threshold area determined by the video analysis system.

10. The system of claim 1, wherein the access control system authorizes the users by:
receiving user information that identifies the users sent from the positioning unit, which the positioning unit extracted from the wireless signals sent by the user devices;
matching the received user information to a stored set of user information for the users; and
determining that the matched user information is referenced within a stored set of authorization information for the users that indicates which users can enter the access point.

11. The system of claim 1, further comprising a system controller including a controller database, and wherein in response to the access control system determining that the non-authorized users are tailgating through the access point, the access control system sends event information associated with tailgating to the system controller for storing to the controller database.

12. An access control system for monitoring an access point, comprising:
a system controller;
a positioning unit for tracking locations of users carrying user devices relative to the access point based on wireless signals from the user devices, the positioning unit including antennas that receive packet data from the user devices of the users, the positioning unit communicating with the system controller;
at least one video camera that captures video data of a scene that includes a threshold area of the access point; and
a video analysis system that analyzes the video data to determine a number of users within a threshold area of the access point, wherein the access control system determines that the users are tailgating by determining that a number of user devices detected within the threshold area by the positioning unit does not match the number of individuals within the threshold area determined by the video analysis system;
wherein the access control system determines whether the users are authorized to pass through the access point based on the wireless signals from the user devices and determines whether non-authorized users are tailgating through the access point.

13. The system of claim 12, wherein in response to the access control system determining that all of the users are non-authorized, the access control system generates an alert in response to determining that the non-authorized users remain within a threshold area of the access point for longer than a predetermined lingering threshold value.

14. A method for controlling access of users to an access point, comprising:
tracking locations of users carrying user devices relative to the access point via a positioning unit associated with the access point, based on wireless signals sent from the user devices;
determining whether the users are authorized to pass through the access point based on the wireless signals from the user devices and determining whether non-authorized users are tailgating through the access point; and
generating an alert in response to determining that the non-authorized users remain within a threshold area of the access point for longer than a predetermined lingering threshold value.

15. The method of claim 14, further comprising the positioning unit detecting the wireless signals from the user devices and determining whether the wireless signals are originating from a threshold area of the access point.

16. The method of claim 14, further comprising the positioning unit determining whether the wireless signals are originating from the threshold area via a directional antenna of the positioning unit.

17. The method of claim 16, further comprising the positioning unit detecting the wireless signals from the user devices using an omnidirectional antenna of the positioning unit.

18. The method of claim 14, further comprising signaling a door controller of the access point to deny the non-authorized users to pass through the access point in response to determining that all of the users are non-authorized users.

19. The method of claim 14, wherein determining whether non-authorized users are tailgating through the access point comprises:
the positioning unit detecting that two or more user devices are first located within a threshold area of the access point;
determining that at least one of the users is not an authorized user; and
the positioning unit then detecting that at least one non-authorized user has passed through the access point with at least one authorized user.

20. The method of claim 14, further comprising generating an alarm upon determining that a non-authorized user has tailgated through the access point.

21. The method of claim 20, wherein in response to determining that the non-authorized user has passed through the access point, signaling door controllers of other access points in the vicinity of the access point associated with the restricted area to deny the non-authorized users passage through the other access points.

22. A method for controlling access of users to an access point, comprising:
tracking locations of users carrying user devices relative to the access point via a positioning unit associated with the access point, based on wireless signals sent from the user devices;
determining whether the users are authorized to pass through the access point based on the wireless signals from the user devices and determines whether non-authorized users are tailgating through the access point;

at least one video camera capturing video data of a scene that includes a threshold area of the access point;

analyzing the video data to determine a number of users within the threshold area of the access point; and determining that the users are tailgating by determining that a number of user devices detected within the threshold area does not match the number of individuals within the threshold area determined from analyzing the video data.

23. The method of claim 22, further comprising generating an alert in response to determining that the non-authorized users remain within a threshold area of the access point for longer than a predetermined lingering threshold value.

* * * * *